US011507881B2

United States Patent
Mimura et al.

(10) Patent No.: US 11,507,881 B2
(45) Date of Patent: Nov. 22, 2022

(54) ANALYSIS APPARATUS, ANALYSIS METHOD, AND ANALYSIS PROGRAM FOR CALCULATING PREDICTION ERROR AND EXTRACTING ERROR FACTOR

(71) Applicant: Hitachi, Ltd., Tokyo (JP)

(72) Inventors: Nodoka Mimura, Tokyo (JP); Yuji Tsushima, Tokyo (JP); Kozo Ikegami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 394 days.

(21) Appl. No.: 16/644,892

(22) PCT Filed: Aug. 13, 2018

(86) PCT No.: PCT/JP2018/030206
§ 371 (c)(1),
(2) Date: Mar. 5, 2020

(87) PCT Pub. No.: WO2019/163160
PCT Pub. Date: Aug. 29, 2019

(65) Prior Publication Data
US 2020/0210894 A1 Jul. 2, 2020

(30) Foreign Application Priority Data
Feb. 22, 2018 (JP) .............................. JP2018-030182

(51) Int. Cl.
*G06F 21/55* (2013.01)
*G06N 20/00* (2019.01)
*G06N 5/02* (2006.01)

(52) U.S. Cl.
CPC ............. *G06N 20/00* (2019.01); *G06F 21/55* (2013.01); *G06N 5/02* (2013.01); *G06F 2221/034* (2013.01)

(58) Field of Classification Search
None
See application file for complete search history.

(56) References Cited

U.S. PATENT DOCUMENTS

| 7,711,655 B2* | 5/2010 | Abe .................. G06Q 30/0283 |
| | | 705/400 |
| 2017/0004404 A1* | 1/2017 | Fujimura ............... G06N 20/00 |
| 2018/0181883 A1 | 6/2018 | Ikeda |

FOREIGN PATENT DOCUMENTS

| JP | 2009-003561 A | 1/2009 |
| JP | 2013-073489 A | 4/2013 |

(Continued)

OTHER PUBLICATIONS

International Search Report for related International Application No. PCT/JP2018/030206, dated Oct. 16, 2018; English translation provided (4 pages).

*Primary Examiner* — James A Edwards
(74) *Attorney, Agent, or Firm* — Procopio, Cory, Hargreaves & Savitch LLP

(57) ABSTRACT

An analysis apparatus comprises: a processor; and a storage device that stores a prediction model that predicts results for contributing factors of a group of events, wherein the processor executes: a prediction error calculation process in which, on the basis of a first prediction value attained by providing the prediction model with a first appearance frequency for contributing factors of a first event among the group of events, and results corresponding to the first appearance frequency, a prediction error of the first prediction value is calculated; and an error factor extraction process in which, on the basis of a correlation between a second appearance frequency for a contributing factor of a second event among the group of events and the prediction error calculated by the prediction error calculation process, (Continued)

an error factor of the prediction error is extracted from among the contributing factors of the first event.

10 Claims, 15 Drawing Sheets

(56) References Cited

FOREIGN PATENT DOCUMENTS

| JP | 2017016632 A | 1/2017 |
|----|--------------|--------|
| JP | 2017-090947 A | 5/2017 |
| WO | 2015/004742 A1 | 1/2015 |
| WO | 2016/063446 A1 | 4/2016 |
| WO | 2016/208159 A1 | 12/2016 |

* cited by examiner

900 — CONTRIBUTING FACTOR TABLE

| CONTRIBUTING FACTOR ITEM | RANGE | FIRST DEGREE OF CORRELATION | WEIGHT |
|---|---|---|---|
| PROXY SERVER – CACHE MISS COUNT | 3~4 | -0.54 | 1.0 |
| PROXY SERVER – CACHE MISS COUNT | 10~15 | 0.46 | 1.0 |
| PROXY SERVER – ABNORMAL RESPONSE COUNT | 0~1 | -0.70 | 1.0 |
| PROXY SERVER – ABNORMAL RESPONSE COUNT | 1~10 | 0.87 | 1.0 |
| PROXY SERVER – TRANSMITTED BYTE COUNT | 300k~500k | 0.78 | 1.0 |
| BUSINESS SERVER – ABNORMAL RESPONSE COUNT | 0~1 | -0.96 | 1.0 |
| BUSINESS SERVER – ABNORMAL RESPONSE COUNT | 10~20 | -0.33 | 1.0 |
| BUSINESS SERVER – ABNORMAL RESPONSE COUNT | 100~300 | 0.56 | 1.0 |
| BUSINESS SERVER – ACCESS COUNT | 90~600 | 0.60 | 1.0 |
| BUSINESS SERVER – AUTHENTICATION FAILURE COUNT | 3~10 | 0.83 | 1.0 |
| ... | ... | ... | ... |

| CONTRIBUTING FACTOR ITEM | RANGE | SECOND DEGREE OF CORRELATION |
|---|---|---|
| PROXY SERVER – CACHE MISS COUNT | 5~7 | -0.33 |
| PROXY SERVER – CACHE MISS COUNT | 10~15 | 0.63 |
| PROXY SERVER – ABNORMAL RESPONSE COUNT | 1~10 | 0.42 |
| PROXY SERVER – TRANSMITTED BYTE COUNT | 300k~500k | -0.78 |
| BUSINESS SERVER – ABNORMAL RESPONSE COUNT | 10~20 | 0.55 |
| BUSINESS SERVER – ABNORMAL RESPONSE COUNT | 30~50 | -0.80 |
| BUSINESS SERVER – ACCESS COUNT | 20~60 | 0.63 |
| BUSINESS SERVER – AUTHENTICATION FAILURE COUNT | 1~1 | 0.27 |
| ... | ... | ... |

1200 ERROR FACTOR TABLE

FIG.12

| CONTRIBUTING FACTOR ITEM | RANGE | FIRST DEGREE OF CORRELATION | WEIGHT |
|---|---|---|---|
| PROXY SERVER – CACHE MISS COUNT | 3~4 | -0.54 | 1.0 |
| PROXY SERVER – CACHE MISS COUNT | 10~15 | 0.46 | 0.5 |
| PROXY SERVER – ABNORMAL RESPONSE COUNT | 0~1 | -0.70 | 1.0 |
| PROXY SERVER – ABNORMAL RESPONSE COUNT | 1~10 | 0.87 | 0.5 |
| PROXY SERVER – TRANSMITTED BYTE COUNT | 300k~500k | 0.78 | 1.0 |
| BUSINESS SERVER – ABNORMAL RESPONSE COUNT | 0~1 | -0.96 | 1.0 |
| BUSINESS SERVER – ABNORMAL RESPONSE COUNT | 10~20 | -0.33 | 1.0 |
| BUSINESS SERVER – ABNORMAL RESPONSE COUNT | 100~300 | 0.56 | 1.0 |
| BUSINESS SERVER – ACCESS COUNT | 90~600 | 0.60 | 1.0 |
| BUSINESS SERVER – AUTHENTICATION FAILURE COUNT | 3~10 | 0.83 | 1.0 |
| ... | ... | ... | ... |

*FIG.13*

ANALYSIS APPARATUS, ANALYSIS METHOD, AND ANALYSIS PROGRAM FOR CALCULATING PREDICTION ERROR AND EXTRACTING ERROR FACTOR

CROSS-REFERENCE TO RELATED APPLICATIONS

This application is a U.S. National Stage entry of PCT Application No: PCT/JP2018/030206 filed Aug. 13, 2018, which claims priority to Japanese patent application JP 2018-030182 filed on Feb. 22, 2018, the content of which is hereby incorporated by reference into this application.

BACKGROUND

The present invention pertains to an analysis apparatus that analyzes data, an analysis method, and a recording medium.

In cyberspace, those engaging in cyberattacks have structural advantages, and such attacks are becoming increasingly sophisticated, increasing in frequency, and changing on a daily basis. Amid this situation, the targets of such attacks have expanded to infrastructure operators from previous targets such as financial service providers and IT (information technology) service providers. Costs to deal with such attacks are trending upward, but investment has not caught up. There are an insufficient number of security specialists and ensuring sufficient personnel for the future is becoming an issue. There are concerns that a lack of a sufficient number of security experts might hinder the operations of SOCs (security operation centers), which monitor information systems and control systems for security incidents. In particular, social infrastructure operators are increasingly tending to monitor the entire monitored system, which means that a large-scale improvement in the operational capabilities of SOCs 130 compared to the past is required.

Determination of the degree of importance of security alerts received from firewalls (FWs), intrusion prevention systems (IPSs), and the like require the greatest workload among the operations performed by the SOCs 130 (determination as to whether the incident is a false positive is conducted manually). Conventionally, if a security alert occurred, an SOC expert would have referred to device logs in the monitored system and external threat information (URLs (Uniform Resource Locators), degree of risk evaluation for malware, etc.) and determined the degree of importance of the alert from experience and instinct. In order to realize SOC operations that can be sustained into the future amid increasing cyberattacks and the increasing scale of monitored systems, determination of the degree of importance of security alerts needs to be automated or supported.

The information processing device disclosed in WO 2016/208159 calculates the degree of dissimilarity, that is the distance, between feature values (IP address, host name, detection rules, number of the same alert within a given period, n-gram appearance frequency of packet payload) of communication information for past alerts, and feature values of communication information for newly occurring alerts, and determines the degree of importance of the new alert according to the distance and determination results for past alerts.

A demand prediction device according to JP 2017-16632 A determines the error between prediction values and actual values for past demand in various areas (number of customers in the store, sales, power consumption, and the like), and if the error is an anomalous value, then a new predictor variable is acquired, with the anomalous value as the response variable, and the new predictor variable is added to the prediction model.

Considering the increasing scale of monitored systems, and the day-to-day changes in method and increase in cyberattacks, the dimensions and ranges of feature values for log items and external threat information items of devices to be learned have become very multifaceted and ever-changing. Thus, there is a problem that a lot of noise is added to analysis results of contributing factors impacting the determination as to the degree of importance of the alert, and as a result, the degree of importance can no longer be accurately predicted.

Also, in general, there is a well-known problem that when the number of dimensions of the feature values becomes very high, there is no difference in the calculated distance, or in other words, all alerts appear similar. Thus, the device in WO 2016/208159 cannot handle determination of the degree of importance of alerts in cases in which the scale of the monitored system becomes large, or cases in which the use of feature values based on not only communication information but various logs results in a very large number of dimensions of the feature values. Also, in JP 2017-16632 A, an increase in predictor variables results in an increase in noise, resulting in an even larger error in the prediction values.

SUMMARY

An object of the present invention is to identify the error factors resulting in prediction error.

An analysis apparatus which is an aspect of the invention disclosed in the present application comprises: a processor; and a storage device that stores a prediction model that predicts results for contributing factors of a group of events, wherein the processor executes: a prediction error calculation process in which, on the basis of a first prediction value attained by providing the prediction model with a first appearance frequency for contributing factors of a first event among the group of events, and results corresponding to the first appearance frequency, a prediction error of the first prediction value is calculated; and an error factor extraction process in which, on the basis of a correlation between a second appearance frequency for a contributing factor of a second event among the group of events and the prediction error calculated by the prediction error calculation process, an error factor of the prediction error is extracted from among the contributing factors of the first event.

According to a representative embodiment of the present invention, it is possible to identify the error factors resulting in prediction error. Other objects, configurations, and effects than those described above are clarified by the following description of an embodiment.

BRIEF DESCRIPTION OF THE DRAWINGS

FIG. 9 is a descriptive view showing an example of the contributing factor table.

FIG. 12 is a descriptive view showing an example of the error factor table.

FIG. 13 is a descriptive view showing an example of the contributing factor table after being updated.

DETAILED DESCRIPTION OF THE EMBODIMENT

<System Configuration Example>

Figure 1:
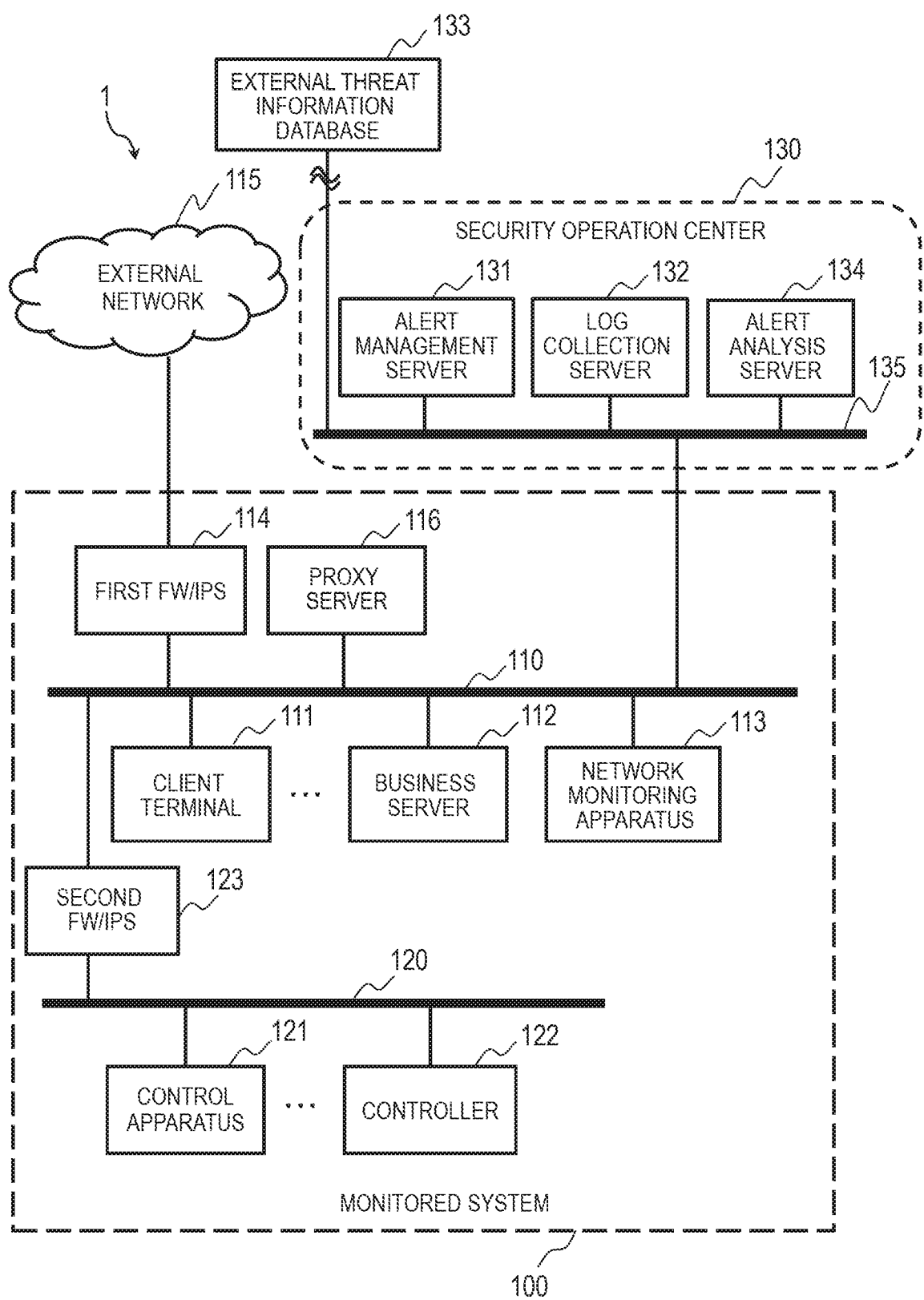
FIG. 1 is a block diagram showing a system configuration example of a monitoring system.

FIG. 1 is a block diagram showing a system configuration example of a monitoring system. The monitoring system 1 has a monitored system 100 and an SOC 130. The monitored system and the SOC 130 are connected to each other in a manner enabling communication therebetween. The monitored system 100 is a system monitored by the SOC 130. The monitored system 100 has a first network 110, one or more client terminals 111, a business server 112, a network monitoring apparatus 113, a first FW and/or IPS 114 (hereinafter referred to as first FW/IPS 114), and a proxy server 116.

The first network 110 is a bus, for example, and can connect the one or more client terminals 111, the business server 112, the network monitoring apparatus 113, the first FW/IPS 114, the proxy server 116, a second FW and/or IPS 123 (hereinafter referred to as second FW/IPS 123), and the SOC 130 in a manner enabling communication therebetween. The first FW/IPS 114 is connected to an external network 115 so as to be able to communicate therewith. The external network 115 is a local area network (LAN), wide area network (WAN), or the internet, for example.

Also, the monitored system 100 has a second network 120, a control apparatus 121, a controller 122, and the second FW/IPS 123. The second network 120 is a bus, for example, and is connected to the second network 120, the control apparatus 121, the controller 122, and the second FW/IPS 123 in a manner allowing communication therebetween.

The SOC 130 has an alert management server 131, a log collection server 132, an alert analysis server 134, and a third network 135. The third network is a bus, for example, and is connected to the alert management server 131, the log collection server 132, the alert analysis server 134, and an external threat information database 133 in a manner allowing communication therebetween.

The alert management server 131, as one example, acquires and stores alerts such as the detection of a virus, detection of unusual behavior, and detection of a connection to an unregistered device from a security apparatus or security software in the monitored system 100. Examples of the security apparatus include the first FW/IPS 114, the second FW/IPS 123, and the network monitoring apparatus 113, and the security software is, for example, antivirus software installed in the client terminal 111 and the business server 112. Alerts are information including the occurrence date/time of the alert, the device subject to the alert (origin of the alert), and the communication partner of the device subject to the alert.

The log collection server 132 acquires and stores logs (excluding alerts) from the monitored system 100. Logs are history information indicating which computer 200 in the monitored system 100 has transmitted/received what type of data with which communication partner, and when.

The alert analysis server 134 uses alerts managed by the alert management server 131, logs managed by the log collection server 132, and threat information recorded in the external threat information database 133 to analyze the alerts. The external threat information database 133 is a database that publicly discloses threat information on the internet, for example. Threat information includes, for example, information on malware, program vulnerabilities, spam, and illegitimate URLs.

<Hardware configuration example of the various computers>

Figure 2:
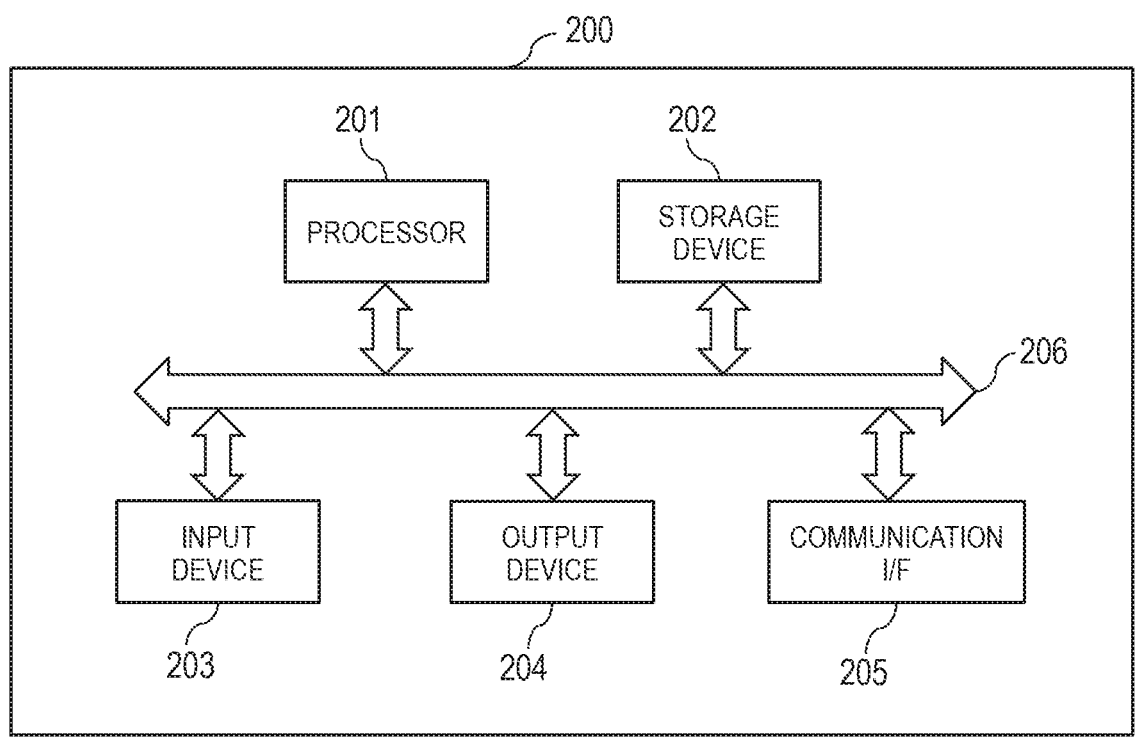
FIG. 2 is a block diagram illustrating a hardware configuration example of the various computers illustrated in FIG. 1.

FIG. 2 is a block diagram illustrating a hardware configuration example of the various computers (the client terminal 111, the business server 112, the network monitoring apparatus 113, the first FW/IPS 114, the proxy server 116, the control apparatus 121, the controller 122, the second FW/IPS 123, the alert management server 131, the log collection server 132, and the alert analysis server 134) illustrated in FIG. 1.

The computer 200 includes a processor 201, a storage device 202, an input device 203, an output device 204, and a communication interface (communication IF) 205. The processor 201, the storage device 202, the input device 203, the output device 204, and the communication IF 205 are connected to one another by a bus 206. The processor 201 controls the computer 200. The processor 201 executes various programs.

The storage device 202 serves as a work area of the processor 201. The storage device 202 is a recording medium which stores the various programs and data. The storage device 202 can be, for example, a read-only memory (ROM), a random access memory (RAM), a hard disk drive (HDD), or a flash memory. The input device 203 inputs data. The input device 203 can be, for example, a keyboard, a mouse, a touch panel, a ten-key pad, or a scanner. The output device 204 outputs data. The output device 204 can be, for example, a display or a printer. The communication IF 205 couples to a network to transmit and receive data.

<Functional Configuration Example of the Alert Analysis Server 134>

Figure 3:
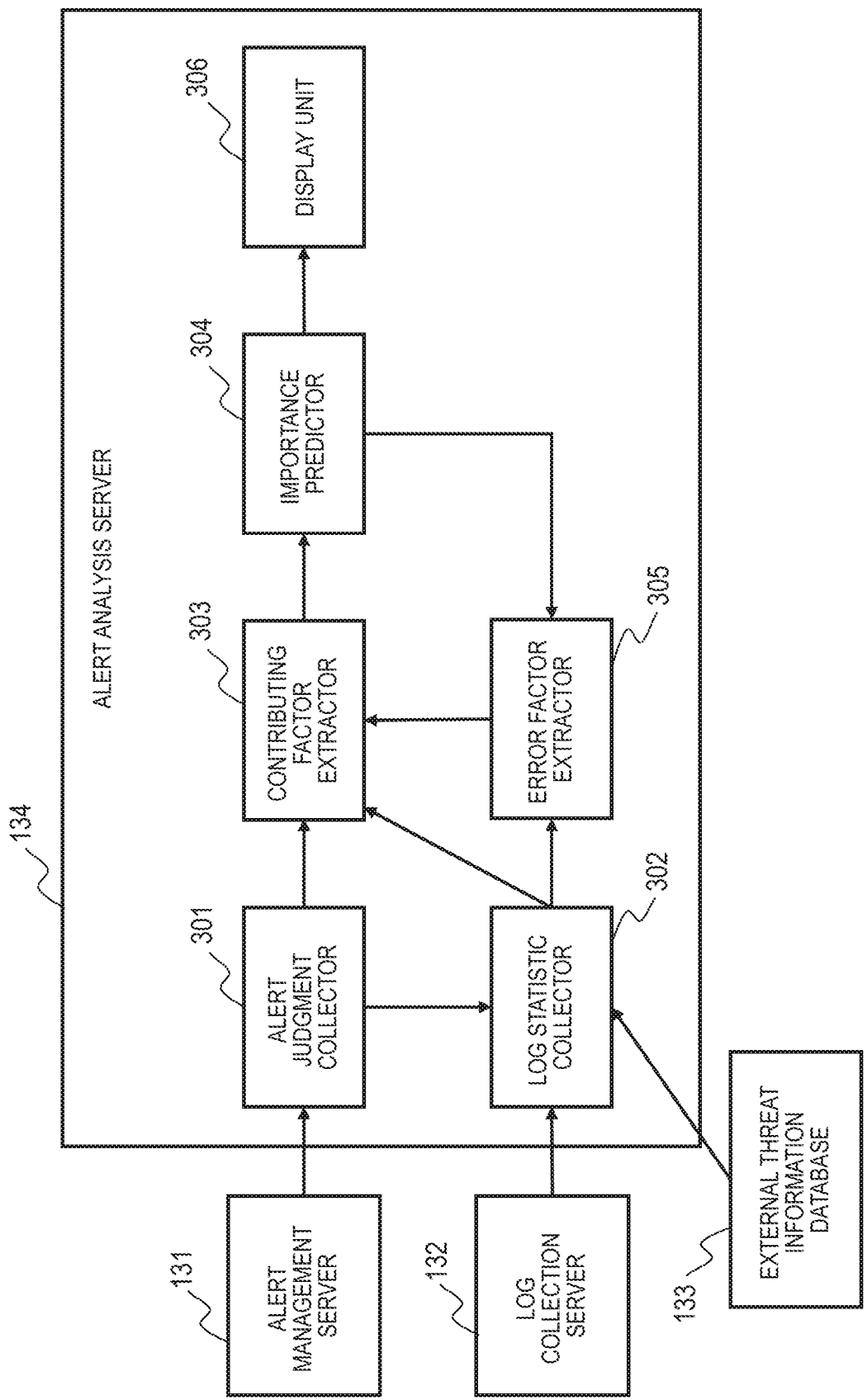
FIG. 3 is a block diagram showing a functional configuration example of the alert analysis server.

FIG. 3 is a block diagram showing a functional configuration example of the alert analysis server 134. The alert analysis server 134 has an alert judgment collector 301, a log statistic collector 302, a contributing factor extractor 303, an importance predictor 304, an error factor extractor 305, and a display unit 306. These specifically are functions realized by a processor 201 executing programs stored in a storage device 202 shown in FIG. 2, for example.

The alert judgment collector 301 acquires alerts from the alert management server 131 and creates an alert judgment collection table 500. The alert judgment information is information in which processing results for the alert are added to the alert (occurrence time, device subject to alert, communication partner). Processing results are information pertaining to the alert such as "judged to be false positive", "judged to be attack that has not yet been handled", "judged to be attack that has been handled", or "unprocessed", for example. Details of the alert judgment collection table 500 will be described later. The log statistic collector 302 acquires logs from the log collection server 132 and creates a log statistic collection table 600. Log statistics are statistical information pertaining to the log when an alert occurs among the collected group of logs. The log statistics include the cache miss count, the abnormal response count, the access count, the IP address danger level, the URL danger level, and the like within a prescribed analysis period, for example. Specific details of the log statistic collection table will be described later. The contributing factor extractor 303 uses alert judgment results (learning data) in the alert judgment collection table 500 and log statistics (learning data) in the log statistic collection table 600 to extract contributing factors linked to the alert judgment. The alert judgment results (learning data) are alert judgment information selected as learning data among the alert judgment information within a prescribed analysis period. The log statistics (learning data) are log statistics selected as learning data among the log statistics within a prescribed analysis period. Contributing factors are information indicating the cause of the alert. Examples thereof include the "cache miss count of the proxy server being 10-15 times within a given period".

The contributing factor extractor 303 uses error factor results from the error factor extractor 305 to reduce the weight of the extracted factor included among error factors to update the extracted contributing factor results and outputs the results to the importance predictor 304. Error factors are contributing factors in which there is an error in the prediction value for the degree of importance of the alert attained from a prediction model to be described later, among the contributing factors.

The importance predictor 304 creates a prediction model that predicts the alert importance from alert judgment results (test data) and contributing factor extraction results from the contributing factor extractor 303. The alert importance is an index that indicates the degree of importance of the alert from the monitored system 100. In this example, there is an alert importance P1 in which the alert processing results indicate a "false positive" (an attack being judged to have occurred despite there being no attack), an alert importance P2 (>P1) in which the alert processing results indicate that an attack identified by the alert has been "handled", and an alert importance P3 (>P2) in which the alert processing results indicate that an attack identified by the alert has "yet to be handled".

Also, the importance predictor 304 feeds the log statistics (test data) in the log statistic collection table 600, to be described later, to the created prediction model, thereby calculating the prediction value (hereinafter, the importance prediction value), and uses the alert judgment information (test data) in the alert judgment collection table 500 to determine the prediction error of the importance predictor. The importance predictor 304 lastly uses the updated extracted contributing factor results from the contributing factor extractor 303 to update the prediction model.

Also, the importance predictor 304 feeds the log statistics (prediction data) to the prediction model to calculate the importance prediction value. The log statistics (prediction data) are log statistics selected as prediction data in the log statistic collection table 600.

The error factor extractor 305 uses the prediction error for the importance prediction value from the importance predictor 304 and the log statistics (test data) in order to extract the contributing factor linked to the prediction error and output the extracted error factor results to the contributing factor extractor 303. As a result, the contributing factor extractor 303 can update the extracted contributing factor results.

The display unit 306 displays the prediction results for the log statistics (prediction data) from the importance predictor 304 in a display. Specific details regarding the content displayed will be described later.

<Operation Sequence Example of Alert Judgment and Log Statistic Collection>

Figure 4:
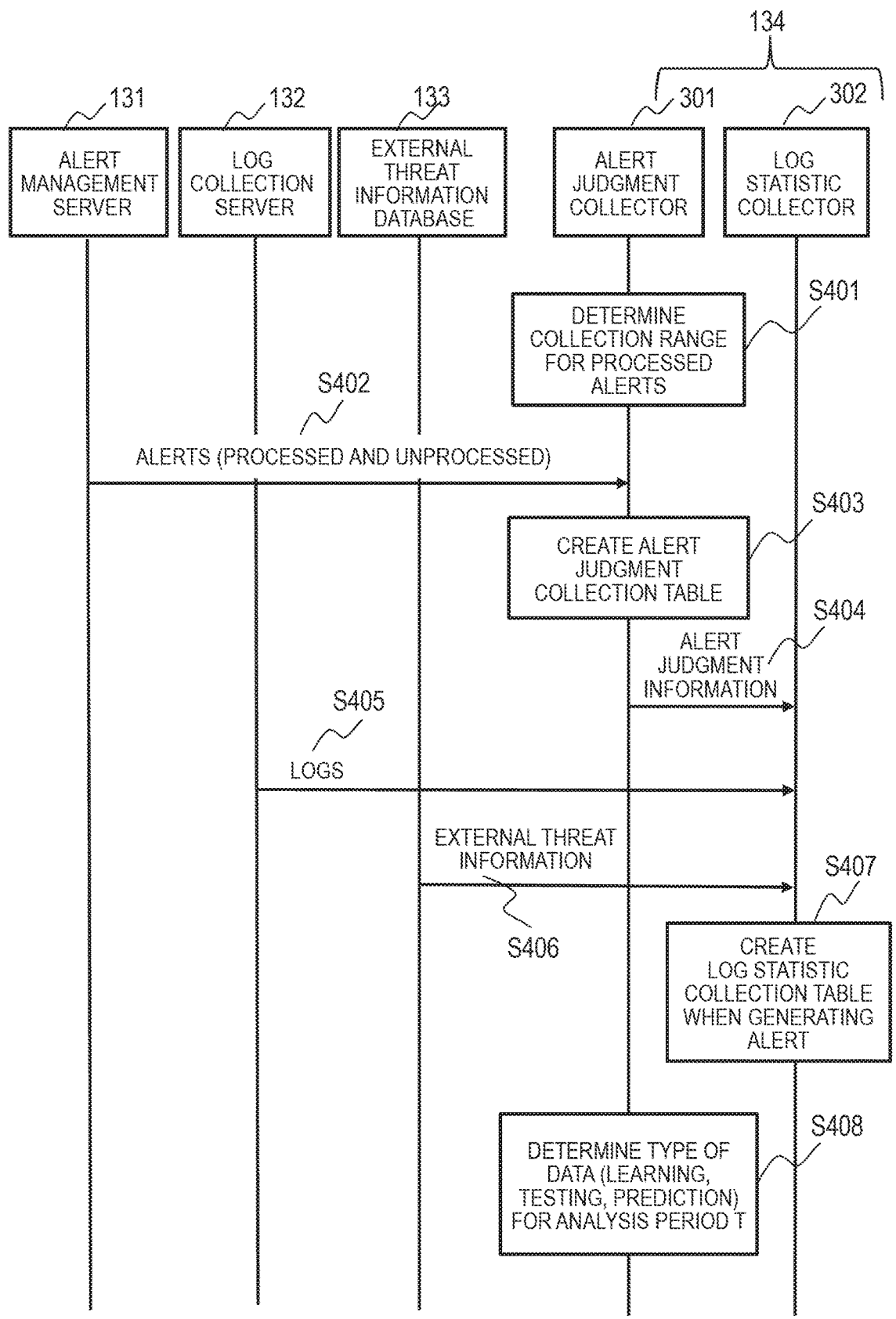
FIG. 4 is a sequence drawing showing an operation sequence example for alert judgment and log statistic collection.

FIG. 4 is a sequence drawing showing an operation sequence example for alert judgment and log statistic collection. The alert judgment collector 301 determines the collection range for processed alerts by user operation, for example (step S401). Processed alerts are alerts for which the processing results by the alert judgment collector 301 are not "unprocessed". The collection range is a period over which the alerts are collected, and here, the alert judgment collector 301 determines an analysis period T from a given point in time in the past to the current time.

The alert judgment collector 301 receives alerts collected by the alert management server 131 from the alert management server 131 (step S402). The alert judgment collector 301 uses alerts in the collection range among the received alerts to create the alert judgment collection table 500 (step S403).

The alert judgment collector 301 transmits alert judgment information from the alert judgment collection table 500 to the log statistic collector 302 (step S404).

The log statistic collector 302 receives the alert judgment information from the alert judgment collector 301 and receives logs from the log collection server 132 (step S405), and receives external threat information from the external threat information database 133 (step S406). The log statistic collector 302 uses the received alert judgment information, the logs, and the external threat information to create the log statistic collection table 600 for when alerts are generated (step S407).

Also, the alert judgment collector 301 determines the data type of alert judgment results in an analysis period T (step S408). Data types include three types, for example: learning, testing, and prediction. The learning data type is used in creating the prediction model, the testing data type is used by being fed to the created prediction model to calculate the importance prediction value, and the prediction data type is used by being fed to a prediction model that is updated in consideration of error factors to calculate the importance prediction value.

<Alert Judgment Collection Table 500>

Figure 5:
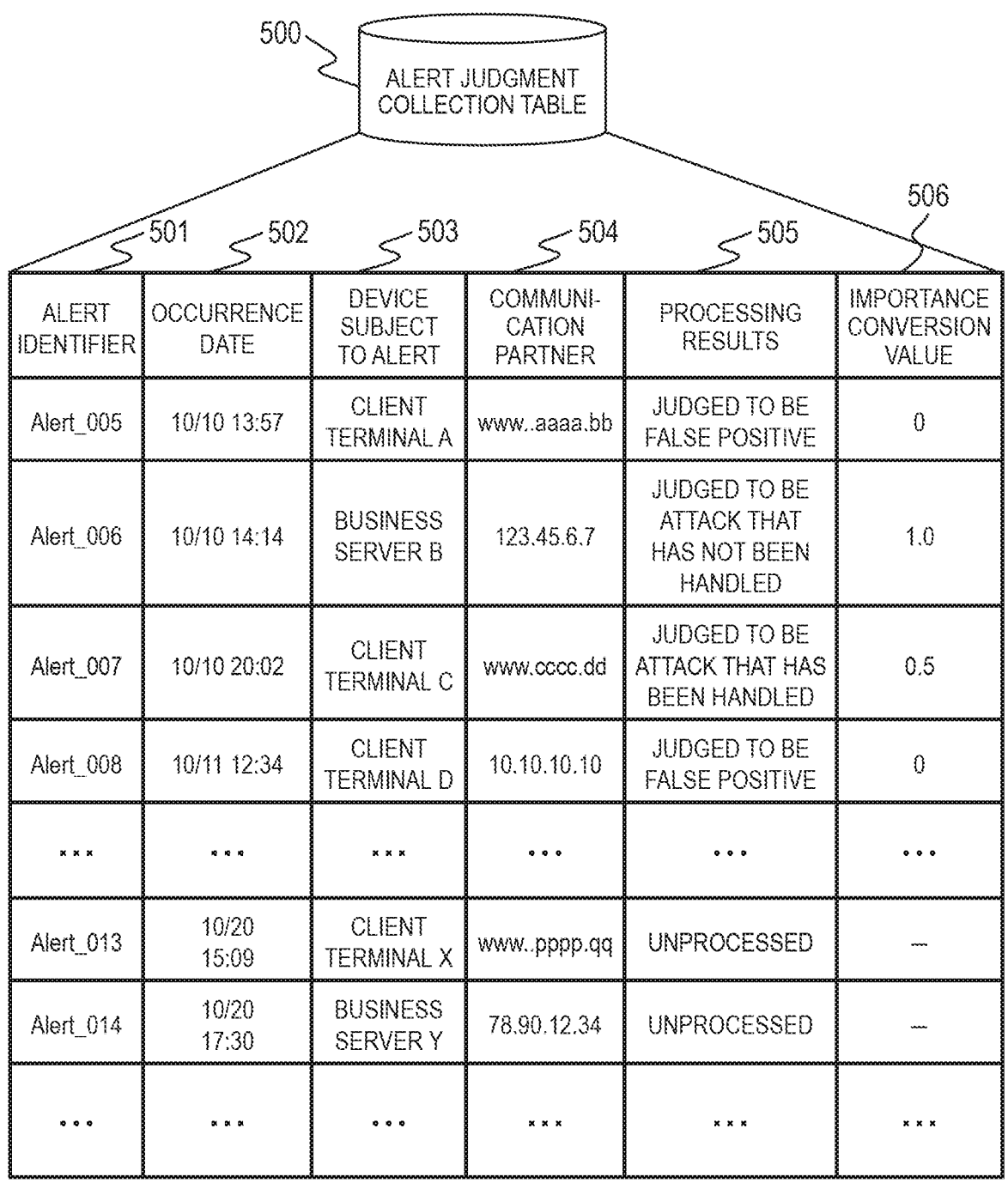
FIG. 5 is a descriptive view showing an example of the alert judgment collection table.

FIG. 5 is a descriptive view showing an example of the alert judgment collection table 500. The alert judgment collection table 500 is a table that is a collection of alert judgment information, that is created by the alert judgment collection table 301 (step S403), and that is stored in the storage device 202 of the alert analysis server 134. The alert judgment collection table 500 has, as fields, an alert identifier 501, an occurrence date/time 502, a device 503 subject to the alert, a communication partner 504, processing results 505, and an importance conversion value 506.

The alert identifier 501 is identification information that uniquely identifies an alert. The occurrence date/time 502 is the date and time when the alert occurred. The device 503 subject to the alert is the source of the alert. The communication partner 504 is the destination of data transmitted by the device 503 subject to the alert or the source of the data transmitted to the device 503 subject to the alert. The alert identifier 501, the occurrence date/time 502, the device 503 subject to the alert, and the communication partner 504 together constitute the alert.

As described above, the processing results 505 are information pertaining to the alert such as "judged to be false positive", "judged to be attack that has not yet been handled", "judged to be attack that has been handled", or "unprocessed", for example. The processing results 505 are information inputted by the alert analysis server 134 by user operation (deemed to be "unprocessed" if there is no input). The alert identifier 501, the occurrence date/time 502, the device 503 subject to the alert, the communication partner 504, and the processing results 505 together constitute the alert judgment results.

The importance conversion value 506 is a numerical value equivalent of the processing results 505. The importance conversion value 506 has a range of 0.0 to 1.0, for example. In this example, if the processing results 505 indicate a "false positive", then the importance conversion value 506 is "0.0", if the processing results 505 indicate "handled", then the importance conversion value 506 is "0.5", and if the processing results 505 indicate "attack not yet handled", then the importance conversion value 506 is "1.0". The higher the importance conversion value 506 is, the higher the danger is.

<Log Statistic Collection Table 600>

Figure 6:
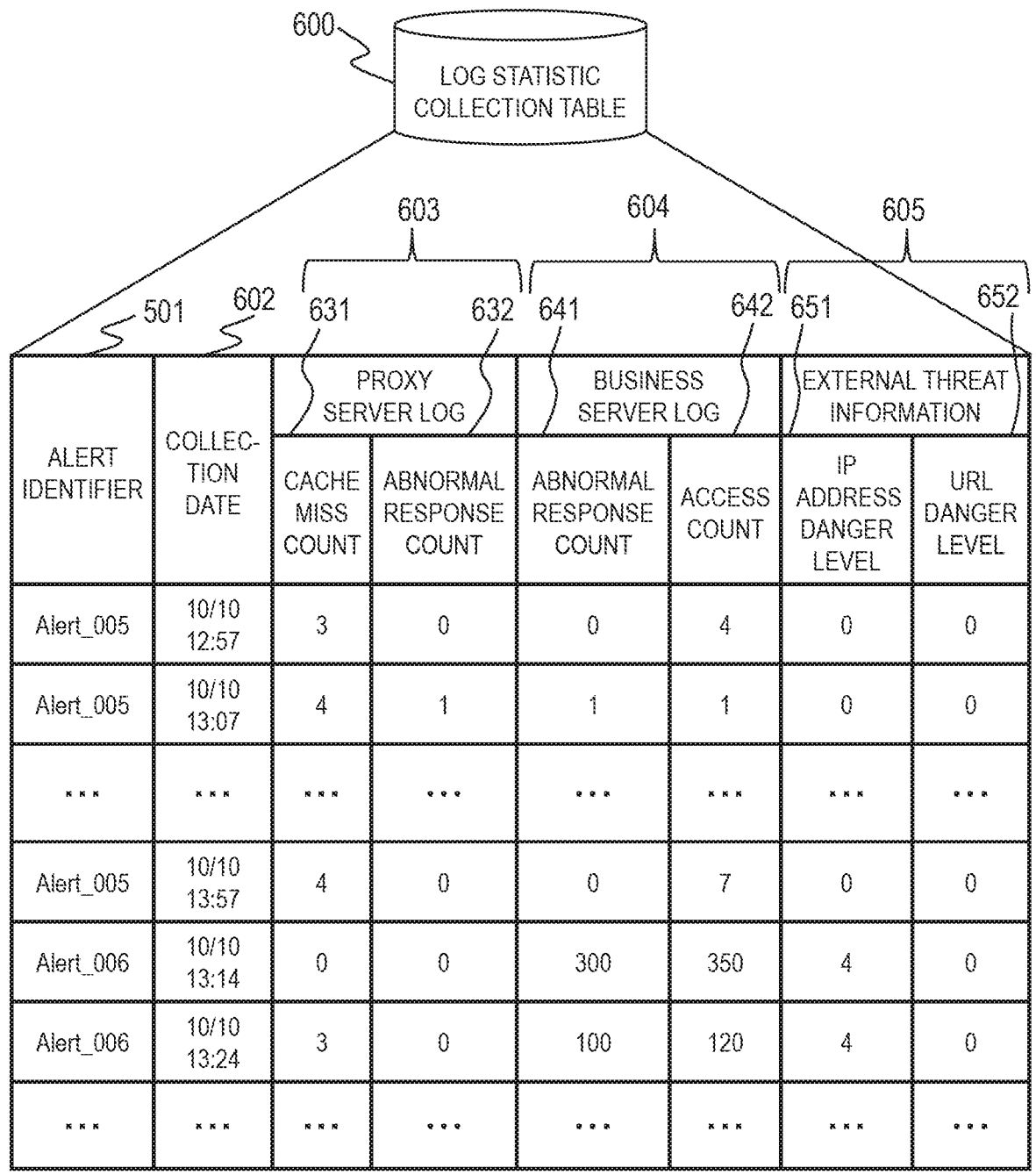
FIG. 6 is a descriptive view showing an example of the log statistic collection table.

FIG. 6 is a descriptive view showing an example of the log statistic collection table 600. The log statistic collection table 600 is a table that is a collection of log statistics and is created by the log statistic collector 302 (step S407), and is stored in the storage device 202 of the alert analysis server 134. The log statistic collection table 600 has, as fields, the alert identifier 501, a collection date/time 602, a proxy server log 603, a business server log 604, and external threat information 605.

Logs of other computers (client terminal 111, FWs/IPSs 114 and 123, network monitoring apparatus 113) in the monitored system 100 may be present in addition to the proxy server log 603, the business server log 604, and the external threat information 605, but the logs of the other computers are omitted from FIG. 6. The collection date/time 602 is the date and time at which logs were collected by the log collection server 132 at a uniform time interval from a time that is a prescribed period before the occurrence date/time 502 of the alert identified by the alert identifier 501 to the occurrence date/time 502.

In this example, the prescribed time is one hour, and the uniform time interval is ten minutes. The collection date/time 602 indicates the end time for the uniform time interval. An entry where the collection date/time 602 is "10/10 12:57" indicates statistics of logs (log statistics) collected over a ten-minute period from 12:48 to 12:57 on 10/10.

The alert with an alert identifier 501 of "Alert 005" has an alert occurrence date/time 502 of "10/10 13:57" (see FIG. 5), for example, and thus, the collection dates/times 602 of the alert with the alert identifier 501 of "Alert 005" are "10/10 12:57", which is one hour before the occurrence date/time 502 of "10/10 13:57", and times at ten minute intervals from "10/10 13:57": "10/10 13:07", "10/10 13:17", "10/10 13:27", "10/10 13:37", "10/10 13:47", and "10/10 13:57" (occurrence date/time 502). In this manner, the collection timing is set for the log statistics when an alert occurs.

The proxy server log 603 has, as subfields, a cache miss count 631 and an abnormal response count 632. The cache miss count 631 is the number of cache misses in the proxy server 116 at the collection date/time 602. The abnormal response count 632 is the number of abnormal responses received by the proxy server 116 at the collection date/time 602. There may be subfields of the proxy server log 603 other than the cache miss count 631 and the abnormal response count 632 (such as the communication byte count) but such subfields are omitted from FIG. 6.

The business server log 604 has, as subfields, an abnormal response count 641 and an access count 642. The abnormal response count 641 is the number of abnormal responses received by the business server 112 at the collection date/time 602. The access count 642 is the number of times the business server 112 is accessed by other computers 200 during the collection period of the uniform time interval specified by the collection date/time 602. There may be subfields of the business server log 604 other than the abnormal response count 641 and the access count 642 (such as an authentication failure count) but such subfields are omitted from FIG. 6. The external threat information 605 has, as subfields, an IP address danger level 651 and a URL danger level 652. The IP address danger level 651 is an index in the external threat information database 133 that indicates in levels the danger of an IP address of a communication partner 504 of a device 503 subject to the alert at the collection date/time 602 if the device 503 is indicated by the IP address. In this example, there are six danger levels of 0 to 5, with 5 being the highest danger level.

The URL danger level 652 is an index in the external threat information database 133 that indicates in levels the danger of a URL of a communication partner 504 of a device 503 subject to the alert at the collection date/time 602 if the device 503 is indicated by the URL. In this example, there are six danger levels of 0 to 5, with 5 being the highest danger level. There may be subfields of the external threat information 605 other than IP address danger level 651 and the URL danger level 652 but such subfields are omitted from FIG. 6.

<Data Type Management Table 700>

Figure 7:
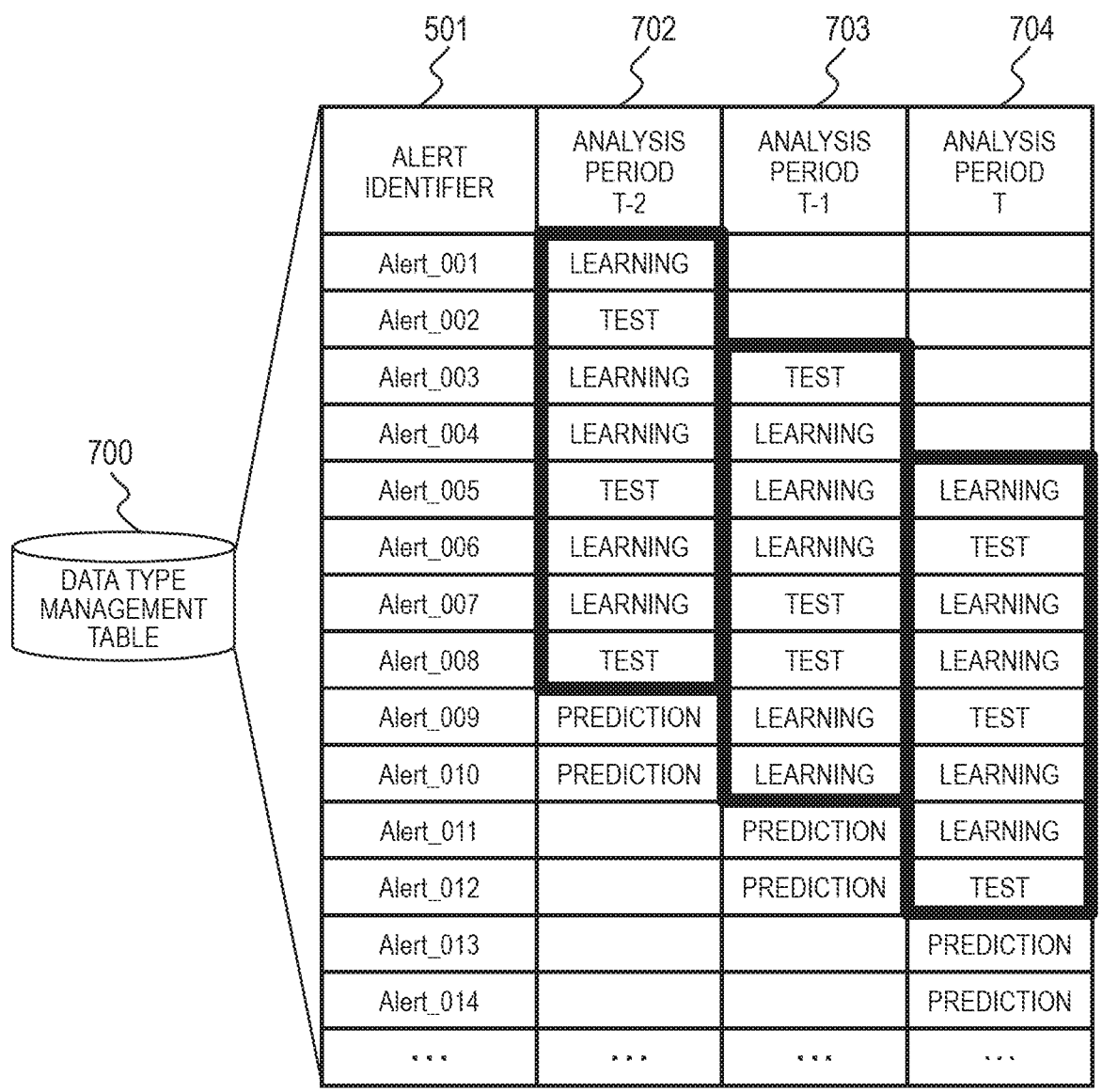
FIG. 7 is a descriptive view showing an example of the data type management table.

FIG. 7 is a descriptive view showing an example of the data type management table 700. The data type management table 700 is a table that defines data types for each alert and is created by the alert judgment collector 301 (step S408), and is stored in the storage device 202 of the alert analysis server 134. The data type management table 700 has, as fields, the alert identifier 501, an analysis period (T-2) 702, an analysis period (T-1) 703, and an analysis period (T) 704.

The analysis period (T-2) 702 is a data type of an alert at an analysis period T-2 determined in step S401, which is two analysis periods prior to the analysis period T. The analysis period (T-1) 703 is a data type of an alert at an analysis period T-1 determined in step S401, which is one analysis period prior to the analysis period T. The analysis period (T) 704 is a data type of an alert at the latest analysis period T determined in step S401.

The alert judgment collector 301 determines the data type randomly for alerts generated in the analysis period T, and stores the data type in the data type management table 700. In such a case, the ratio of data types for "learning" and "testing" may be set in advance. The alert judgment collector 301 determines the data type of an alert from the analysis period T onward, or in other words, an alert for which the processing results 505 indicate "unprocessed", to be "prediction".

Every time a new analysis period T and data type are determined in steps S401 and S408, the analysis period (T-2) 702, the analysis period (T-1) 703, and the analysis period (T) 704 are updated, and the data type of the oldest analysis period T-2 before the determination is deleted. There may be a field for an analysis period T-3 or prior thereto, but this is omitted in FIG. 7.

The alert judgment information of the alert identified by the alert identifier 501 with a data type of "learning" is the alert judgment results (learning data), and the alert judgment information of the alert identified by the alert identifier 501 with a data type of "testing" is the alert judgment results (test data).

Also, the log statistics (entry in FIG. 6) identified by the alert identifier 501 in which the data type is "learning" are log statistics (learning data), the log statistics (entry in FIG. 6) identified by the alert identifier 501 in which the data type is "testing" are log statistics (test data), and the log statistics (entry in FIG. 6) identified by the alert identifier 501 in which the data type is "prediction data" are log statistics (prediction data).

<Operation Sequence for Predicting Alert Importance during Analysis Period T>

Figure 8:
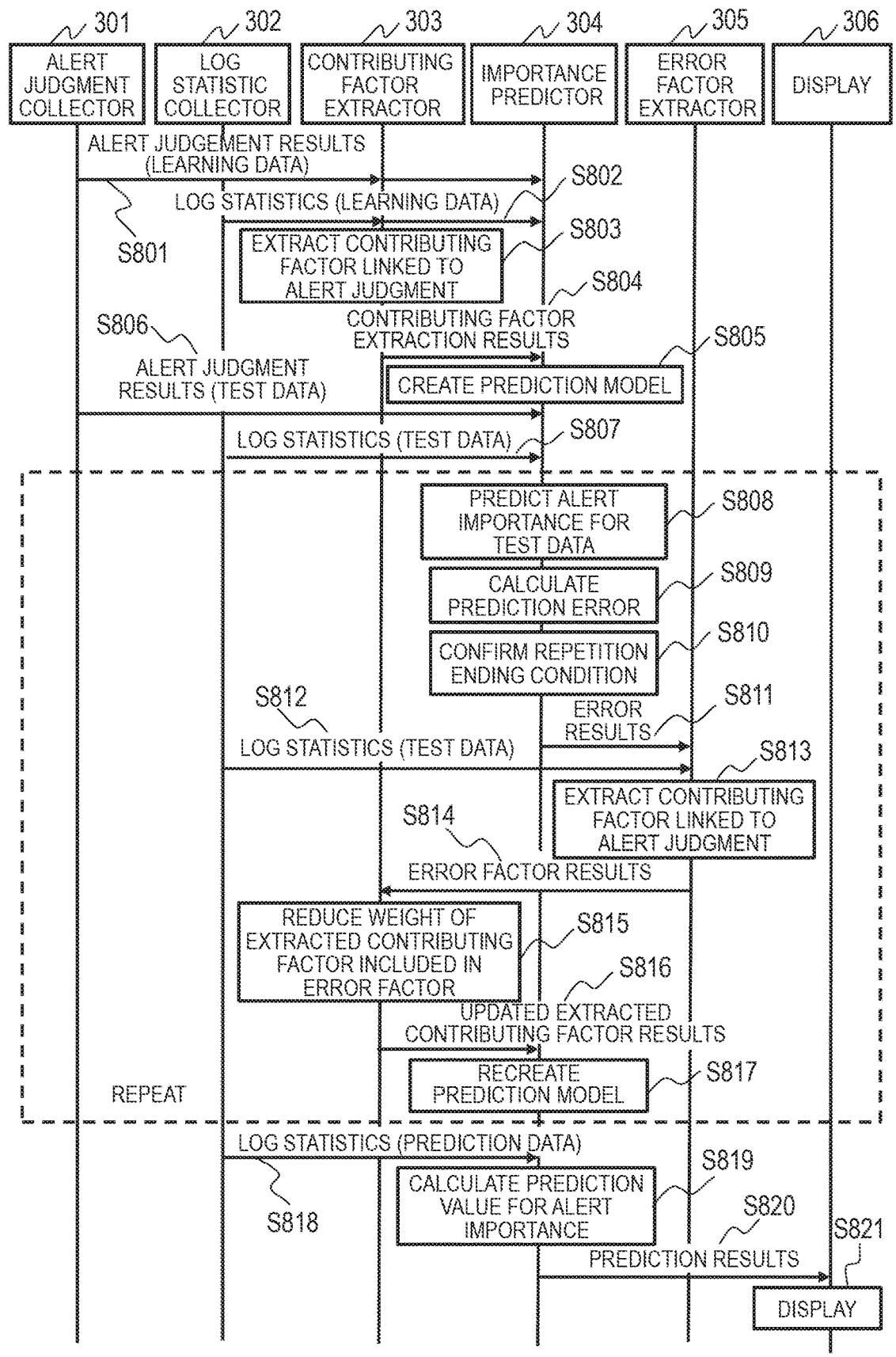
FIG. 8 is a sequence drawing showing an operation sequence example for predicting the alert importance during the analysis period.

FIG. 8 is a sequence drawing showing an operation sequence example for predicting the alert importance during the analysis period T. The alert judgment collector 301 outputs the alert judgment results (learning data) to the contributing factor extractor 303 (step S801). Also, the log statistic collector 302 outputs the log statistics (learning data) to the contributing factor extractor 303 and the importance predictor 304.

The contributing factor extractor 303 uses alert judgment results (learning data) in the alert judgment collection table 500 and log statistics (learning data) in the log statistic collection table 600 to create a contributing factor table 900 and extract contributing factors linked to the alert judgment (step S803). Here, a detailed description will be made regarding the extraction of contributing factors by the contributing factor extractor 303.

FIG. 9 is a descriptive view showing an example of the contributing factor table 900. The contributing factor table 900 has, as fields, a contributing factor item 901, a range 902, a first degree of correlation 903, and a weight 904. The contributing factor item 901 is a contributing factor to be extracted, and has, as subfields, the proxy server log 603, the business server log 604, and the external threat information 605 of the log statistic collection table 600. The range 902 is a range of values that can be acquired for the contributing factor item 901. For example, if the contributing factor item 901 has a range 902 of "3-4" for the "proxy server cache miss count", then the first degree of correlation 903 is determined for when the cache miss count 631 of the proxy server 116 is 3-4.

The first degree of correlation 903 is information indicating the correlation between the range 902 of the contributing factor item 901 and the importance conversion value 506 during alert judgment. The first degree of correlation 903 is a correlation coefficient R1 between an appearance frequency p1 of the range 902 (occurrence probability) attained by dividing the appearance count of the range 902 in the log statistics (learning data) by the collection count of the log statistics (learning data), and the importance conversion value 506 (here, the importance conversion value q), for example. Specifically, for example, the correlation coefficient R1 is determined by the following formula (1) by a standard deviation σp1 of the appearance frequency p1, a standard deviation σq of the importance conversion value q, and a covariance Sp1q of the appearance frequency p1 and the importance conversion value q.

$$R1 = Sp1q/(\sigma p1 \times \sigma q) \quad (1)$$

Here, the appearance frequency p1 will be described in detail. As shown in FIG. 7, the alert identifiers 501 with a data type of "learning" during the analysis period T are the "Alert_005", "Alert_007", "Alert_008", "Alert_010", and "Alert_011". The contributing factor extractor 303 determines the appearance frequency p1 and the importance conversion value q for each alert identifier 501. An example is described here in which the alert identifier 501 is "Alert_005" and the contributing factor item 901 is the "proxy server cache miss count".

As shown in FIG. 6, the cache miss counts 631 of the proxy server log 603 for the alert identifier 501 of "Alert_005" are "3" (10/10 12:57), "4" (10/10 13:07) ... "4" (10/10 13:57). The cache miss count 631 is set to a value other than "3" or "4" for when the collection date/time 602 is "10/10 13:17", "10/10 13:27", "10/10 13:37", and "10/10 13:47".

The appearance count for a range 902 of "3-4" for the cache miss count 631 of the proxy server log 603 for the alert identifier 501 of "Alert_005" is 3. Also, the collection count for the cache miss count 631 of the proxy server log 603 for the alert identifier 501 of "Alert_005" is 7: "10/10 12:57", "10/10 13:07", "10/10 13:17", "10/10 13:27", "10/10 13:37", "10/10 13:47", and "10/10 13:57". Thus, the appearance frequency p1 for the range 902 of "3-4" for the cache miss count 631 of the proxy server log 603 for the alert identifier 501 of "Alert_005" is 3/7. Also, the importance conversion value q for the alert identifier 501 of "Alert_005" is "0" (see FIG. 5).

The contributing factor extractor 303 determines the combination of appearance frequency p1 and importance conversion value q for each alert identifier 501 in which the data type is "learning", determines the standard deviation σp1 of the appearance frequency p1 according to each appearance frequency p1, determines the standard deviation σq of the importance conversion value q according to each importance conversion value q, and determines the covariance Sp1q. The contributing factor extractor 303 uses formula (1) to calculate a correlation coefficient R1 (−0.54) for the range 902 "3-4" for the contributing factor item 901 "proxy server cache miss count" for the alert identifier 501 where the data type is "learning".

If the correlation coefficient R1 indicates a positive correlation (R1>0), this indicates that the alert judgment is correct, and the higher the correlation coefficient R1 is, the higher the danger level by the contributing factor item 901 is. Conversely, if the correlation coefficient R1 indicates a negative correlation (R1<0), this indicates that the alert judgment is mistaken, or in other words, that the results indicate a false positive, and the lower the correlation coefficient R1 is, the lower the danger level by the contributing factor item 901 is, signifying that there are a lot of false positives. Thus, the first degree of correlation is determined for each combination of contributing factor items 901 and ranges 902, and therefore, it is possible to statistically extract which combination of contributing factor items 901 and ranges 902 has a contributing factor linked to the alert judgment.

The weight 904 indicates the degree of importance of the combination of contributing factor items 901 and ranges 902. The weight 904 has a range of 0.0 to 1.0, with an initial value of 1.0. If the first degree of correlation is a positive correlation coefficient R1, then the contributing factor extractor 303 reduces the corresponding weight 904. The weight 904 is multiplied by the above-mentioned appearance frequency p1, and is used to create the prediction model. Thus, when the weight 904 decreases, the effect of the appearance frequency p1, that is, the combination of the contributing factor item 901 and the range 902 is reduced, and the prediction model is updated.

Returning to FIG. 8, the contributing factor extractor 303 outputs the contributing factor extraction results (appearance frequency p1 and importance conversion value q attained from contributing factor table 900) to the importance predictor 304 (step S804). The importance predictor 304 creates a prediction model using the alert judgment results (learning data), the log statistics (learning data), and the contributing factor extraction results (step S805). Here, the response variable Y is the importance conversion value 506 and the predictor variable Xn is P (contributing factor item 901+range 902). P(Z) represents the occurrence probability (appearance frequency p1) of an event Z. The predictor variables Xi are set to the following with reference to the contributing factor table 900: X1=P (proxy server cache miss count [3-4]), X2=P (proxy server cache miss count [10-15]), etc.

As an example of the prediction model, the multiple regression formula such as that of formula (2) below is created. n is the sum total of combinations of the contributing factor item 901 and the range 902, that is, the sum total of events Z.

$$Y = b0 + b1 \times X1 + b2 \times X2 + \ldots + bn \times Xn \quad (2)$$

Here, where $y\_k$ (importance conversion value q=(0.0)) is a value of the response variable Y in relation to an entry k (combination of response variable Y and predictor variables Xn for the Alert_005, for example) of the log statistics (learning data), the value of the predictor variable X1 is $x1\_k$ (appearance frequency p1=3/7), the value of the predictor variable X2 is $x2\_k$ ... and the value of the predictor variable Xn is $xn\_k$, the coefficients b0, b1, b2 ... bn of formula (2) can be determined by the determinant of formula (3) below, for example. In formula (3), i indicates any entry of 1-k in the log statistics (learning data).

$$\begin{pmatrix} b0 \\ b1 \\ b2 \\ \vdots \\ bn \end{pmatrix} = \begin{pmatrix} n & \Sigma x1\_i & \Sigma x2\_i & \ldots & \Sigma xn\_i \\ \Sigma x1\_i & \Sigma x1\_i^2 & \Sigma x2\_i \times x1\_i & \ldots & \Sigma xn\_i \times x1\_i \\ \Sigma x2\_i & \Sigma x1\_i \times x2\_i & \Sigma x2\_i^2 & \ldots & \Sigma xn\_i \times x2\_i \\ \vdots & \vdots & \vdots & \ddots & \vdots \\ \Sigma xn\_i & \Sigma x1\_i \times xn\_i & \Sigma x2\_i \times xn\_i & \ldots & \Sigma xn\_i^2 \end{pmatrix}^{-1} \begin{pmatrix} \Sigma y\_i \\ \Sigma y\_i \times x1\_i \\ \Sigma y\_i \times x2\_i \\ \vdots \\ \Sigma y\_i \times xn\_i \end{pmatrix} \quad (3)$$

The creation method for the prediction model by formula (3) is one example, and the prediction model may be derived by a generally known method such as regularization, decision tree, ensemble learning, neural networks, and Bayesian networks.

The alert judgment collector 301 outputs the alert judgment results (testing data) to the importance predictor 304 (step S806), and the log statistic collector 302 outputs the log statistics (test data) to the importance predictor 304 (step S807).

The importance predictor 304 predicts the alert importance for the test data (step S808). Specifically, for example, the importance predictor 304 feeds the predictor variables $x1\_k, x2\_k \ldots xn\_k$ of the log statistics (test data) to the prediction model to calculate the importance prediction value $y\_k$.

Next, the importance predictor 304 creates a prediction error table 1000 and calculates, for each alert identifier 501, the prediction error between the importance prediction value calculated in step S808 and the importance conversion value 506 included in the alert judgment results (test data) (step S809). Here, the prediction error table 1000 will be described.

Figure 10:
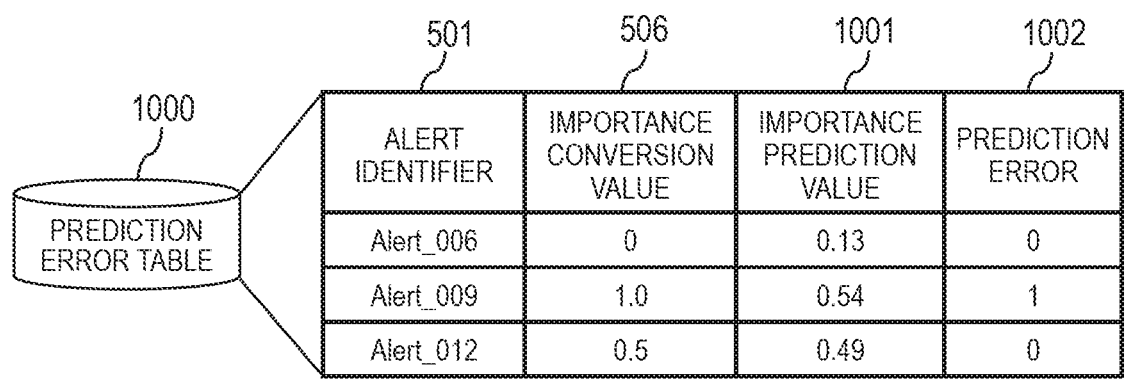
FIG. 10 is a descriptive view showing an example of the prediction error table.

FIG. 10 is a descriptive view showing an example of the prediction error table 1000. The prediction error table 1000 has, as fields, the alert identifier 501, the importance conversion value 506, an importance prediction value 1001, and a prediction error 1002. The importance prediction value 1001 is a prediction value calculated from a prediction model for the alert identifier 501. The importance prediction value 1001, similar to the importance conversion value 506, has a range of 0.0 to 1.0, for example. In this example, the importance prediction value 1001 indicates a "false positive" if the value thereof is 0.0 to less than 0.3, "handled" if the value thereof is 0.3 to less than 0.7, and "attack yet to be handled" if the value thereof is 0.7 to 1. The higher the importance prediction value 1001 is, the higher the danger is.

The prediction error 1002 is a value indicating the error in the importance prediction value 1001. Specifically, for example, the prediction error 1002 is a rounded value of the difference between the importance conversion value 506 and the importance prediction value 1001. If the difference is within an allowable range, this indicates that the prediction was correct, and the importance predictor 304 sets the prediction error 1002 to "0".

In the entry with an alert identifier 501 of "Alert_006", the difference is "0.13", which is within the allowable range, for example. In this case, the prediction error 1002 is set to "0".

On the other hand, if the difference is outside of the allowable range, this indicates that the prediction was off, and the importance predictor 304 sets the prediction error 1002 to "1". In the entry with an alert identifier 501 of "Alert_009", the difference is "0.46", which is outside of the allowable range, for example. In this case, the prediction error 1002 is set to "1".

Returning to FIG. 8, the importance predictor 304 executes repetition ending confirmation for the process inside the dotted frame of FIG. 8 (step S810). Repetition of the process within the dotted frame of FIG. 8 indicates updating (recreation) of the prediction model. Ending conditions for repeat trials of the process within the dotted frame of FIG. 8 will be specifically described.

Figure 11:
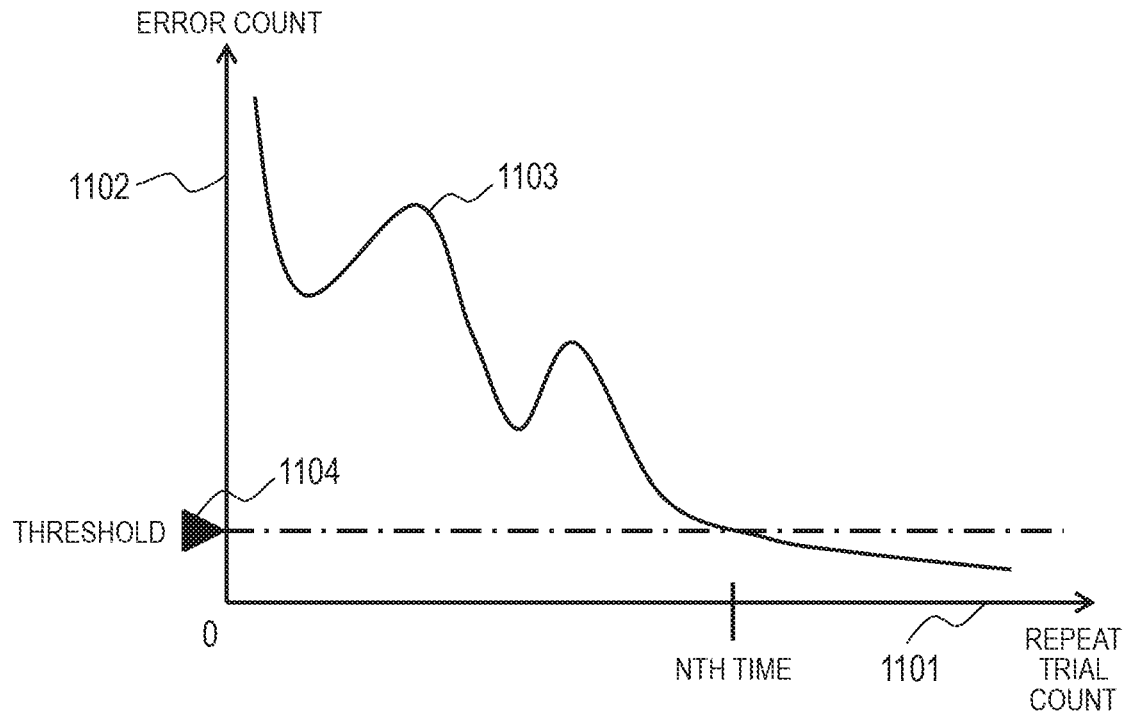
FIG. 11 is a descriptive view of ending conditions for repeat trials within the dotted frame of FIG. 8.

FIG. 11 is a descriptive view of ending conditions for repeat trials within the dotted frame of FIG. 8. FIG. 11 shows a graph 1103 in which the horizontal axis is a repeat trial count 1101 of the process in the dotted frame of FIG. 8, and the vertical axis is an error count 1102. The error count 1102 is the number of entries in which the value of the prediction error 1002 of the prediction error table 1000 is "1". As the repeat trial count 1101 increases, the prediction model is updated, and thus, the error count decreases. If the repeat trial count 1101 falls below a threshold 1104 at the Nth time, the process in the dotted frame of FIG. 8 is ended.

Returning to FIG. 8, if the repetition of the process in the dotted frame has not ended, the importance predictor 304 outputs the error results to the error factor extractor 305 (step S811). The error results are prediction errors 1002 for each alert identifier 501. Also, the log statistic collector 302 outputs the log statistics (testing data) to the error factor extractor 305 (step S812).

The error factor extractor 305 uses error results (prediction error 1002) and the log statistics (test data) to create an error factor table 1200 and extract error factors linked to the error (step S813). Here, a detailed description will be made regarding the extraction of error factors by the error factor extractor 305.

FIG. 12 is a descriptive view showing an example of the error factor table 1200. The error factor table 1200 is created in a similar manner to the contributing factor table 900. The error factor table 1200 has, as fields, a contributing factor item 901, a range 902, and a second degree of correlation 1203. The value of the contributing factor item 901 is the same as that of the contributing factor table 900. The range 902 is a range of values that can be acquired for the contributing factor item 901, and in the case of the error factor table 1200, the range 902 is set by the entry of the log statistics (test data).

The second degree of correlation 1203 is information indicating the correlation between the range 902 of the contributing factor item 901 and the prediction error 1002 during alert judgment. The second degree of correlation 1203 is a correlation coefficient R2 between an appearance frequency p2 (occurrence probability) of the range 902 attained by dividing the appearance count of the range 902 in the log statistics (test data) by the collection count of the log statistics (test data), and the prediction error 1002 (here, the prediction error e), for example. Specifically, for example, the correlation coefficient R2 is determined by the following formula (4) by a standard deviation σp2 of the appearance frequency p2, a standard deviation σe of the prediction error e, and a covariance Sp2e of the appearance frequency p2 and the prediction error e.

$$R2 = Sq2e/(\sigma p2 \times \sigma e) \quad (4)$$

The method for determining the appearance frequency p2 is the same as the appearance frequency p1 other than that for the alert identifier 501, the data type is "testing" during the analysis period T. If the correlation coefficient R2 indicates a positive correlation (R2>0), then the higher the correlation coefficient R2 is, the greater the degree to which the contributing factor item 901 yields a prediction error 1002. Conversely, if the correlation coefficient R2 indicates a negative correlation (R2<0) this indicates that the lower the correlation coefficient R2 is, the lesser the degree to which the contributing factor item 901 yields a prediction error 1002. Thus, the second degree of correlation 1203 is determined for each combination of contributing factor items 901 and ranges 902, and it is possible to statistically extract which combination of contributing factor items 901 and ranges 902 has a contributing factor linked to the prediction errors 1002.

Returning to FIG. 8, the error factor predictor 305 outputs the error factor results to the contributing factor extractor 303 (step S814). Error factor results are the combination of contributing factor items 901 and ranges 902 in which the second degree of correlation 1203 (correlation coefficient R2) indicates a positive correlation (R2>0). In the example of FIG. 12, the error factor results are a combination of the contributing factor item 901 and the range 902 in entries 1211 to 1215.

The contributing factor extractor 303 refers to the error factor results from the error factor extractor 305 to reduce the weight 904 of the extracted factor included among error factors (step S815). Specifically, for example, the contributing factor extractor 303 identifies, from the contributing factor table 900 entries having a combination of contributing factor items 901 and ranges 902 that correspond to the error factor results. Then, the contributing factor extractor 303 reduces and updates the weight 904 of the entries, among the identified entries, in which the first degree of correlation 903 indicates a positive correlation (R1>0).

FIG. 13 is a descriptive view showing an example of the contributing factor table 900 after being updated. If the combination of contributing factor item 901 and range 902 corresponding to the error factor results is in the above-mentioned entries 1211 to 1215, then the contributing factor extractor 303 identifies entries 1301 to 1303 in which the contributing factor item 901 and the range 902 match, among the entries 1211 to 1215. Then, the contributing factor extractor 303 reduces and updates the weight 904 of the entries 1301 and 1302, among the identified entries 1301 to 1303, in which the first degree of correlation 903 indicates a positive correlation (R1>0).

FIG. 13 is an example in which the weight 904 of the identified entries 1301 to 1302 is reduced from 1.0 to 0.5. The reduction amount was set to "0.5" as an example, but the reduction amount can be set to any given value by the user as long as the reduction amount falls within the range of greater than 0 and less than or equal to 1. By reducing the weight 904 by a value greater than 0 and less than 1.0, it is possible to mitigate worsening of importance prediction accuracy of the factor (error factor) affecting the prediction error. Furthermore, by setting the weight 904 to 0, it is possible to more effectively mitigate worsening of importance prediction accuracy by eliminating the factor (error factor) affecting the prediction error. Returning to FIG. 8, the contributing factor extractor 303 outputs the updated contributing factor extraction results to the importance predictor 304 (step S816). Specifically, for example, the contributing factor extractor 303 allows the updated contributing factor table 900 to be referenced by the importance predictor 304. The importance predictor 304 refers to the updated contributing factor table 900 and uses the alert judgment results (learning data), the log statistics (learning data), and the updated contributing factor extraction results to recreate (update) the prediction model by a similar process to step S805 (step S817). Thereafter, the process returns to step S808.

Specifically, for example, where the weight of the predictor variable Xn is Wn, the importance predictor 304 converts the predictor variable Xn to a predictor variable X'n by formula (5) below.

$$X'n = \begin{cases} Wn \times Xn & (0 \leq Xn < Wn) \\ Wn^2 & (Wn \leq Xn) \end{cases} \quad (5)$$

When recreating the prediction model, the importance predictor 304 converts the predictor variable Xn to X'n, and recalculates the coefficients b0, b1, b2 ... bn of formula (2).

Meanwhile, when confirming the ending conditions for repetition in step S810, if the ending conditions for repetition are found to be satisfied, the repeat trials in the dotted frame are ended. In this case, the log statistic collector 302 outputs the log statistics (prediction data) to the importance predictor 304 (step S818). In this case, the importance predictor 304 feeds the log statistics (prediction data) to the prediction model to calculate the importance prediction value 1001 (step S820). The log statistics (prediction data) are log statistics selected as prediction data in the log statistic collection table 600. Thereafter, the importance predictor 304 outputs the prediction results to the display unit 306 (step S821). An output screen display example of the importance prediction value 1001 will be described.

<Output Screen Display Example of Importance Prediction Value 1001>

Figure 14:
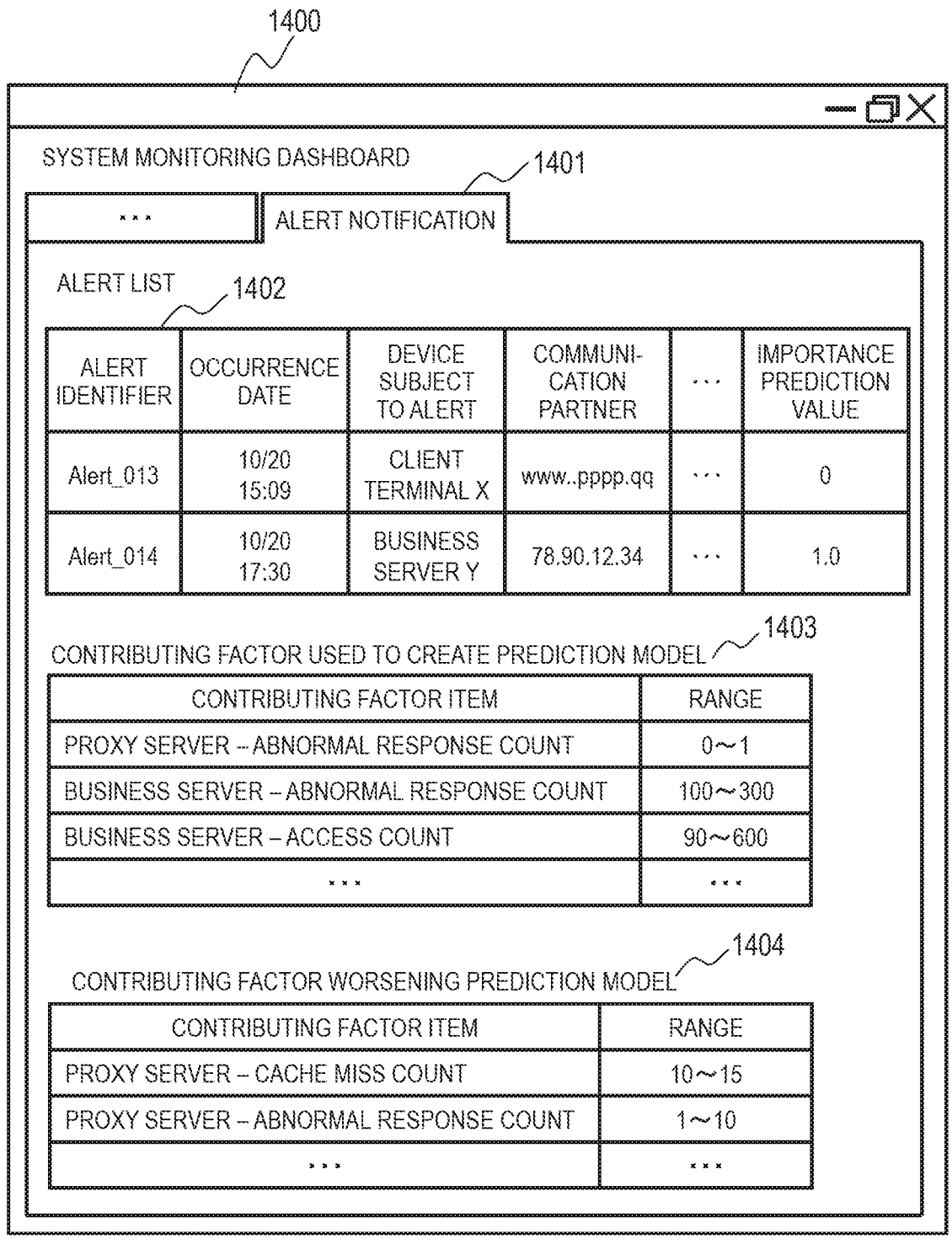
FIG. 14 shows an output screen display example of the importance prediction value.

FIG. 14 shows an output screen display example of the importance prediction value 1001. The output screen 1400 has an alert notification tab 1401. The alert notification tab 1401 displays an alert list 1402, contributing factors 1403 used for creating the prediction model, and contributing factors 1404 that worsen the prediction model (contributing factors that reduce the prediction accuracy of the prediction model). These are generated by the display unit 306 using the prediction results.

In other words, the prediction results from the importance predictor 304 include not only the importance prediction value 1001 calculated in step S820 but also alert judgment information (FIG. 5) pertaining to log statistics (prediction data) provided to the prediction model in order to determine the importance prediction value 1001.

For example, if the alert identifiers 501 of the log statistics (prediction data) are "Alert_013" and "Alert_014", then the occurrence date/time 502, the device 503 subject to the alert, and the communication partner 504 in the entries of the alert judgment collection table 500 with alert identifiers 501 of "Alert_013" and "Alert_014" are the alert judgment information included in the prediction results. The display unit 306 associates the alert judgment information and the importance prediction value 1001 calculated in step 820 to the alert identifier 501 and displays these in the output screen 1400 as the alert list 1402.

Also, the prediction results from the importance prediction value 1001 may include combinations of the contributing factor item 901 and the range 902 (entries in FIG. 13 where the weight 904 is "1.0") that are the contributing factors 1403 used for creating the prediction model. The display unit 306 displays the entries in FIG. 13 where the weight 904 is "1.0" in the output screen 1400 as the contributing factors 1403 used for creating the prediction model.

Also, the prediction results from the importance prediction value 1001 may include combinations of the contributing factor item 901 and the range 902 (entries in FIG. 13 where the weight 904 is not "1.0") that are the contributing factors 1404 that worsen the prediction model. The display unit 306 displays the entries in FIG. 13 where the weight 904 is not "1.0" in the output screen 1400 as the contributing factors 1404 that worsen the prediction model.

In the present embodiment, the display unit 306 displays the prediction results, but the alert analysis server 134 may transmit the prediction results to another computer. In such a case, the computer to which the prediction results are sent may display the prediction results.

<Contributing Factor Extraction Process>

Figure 15:
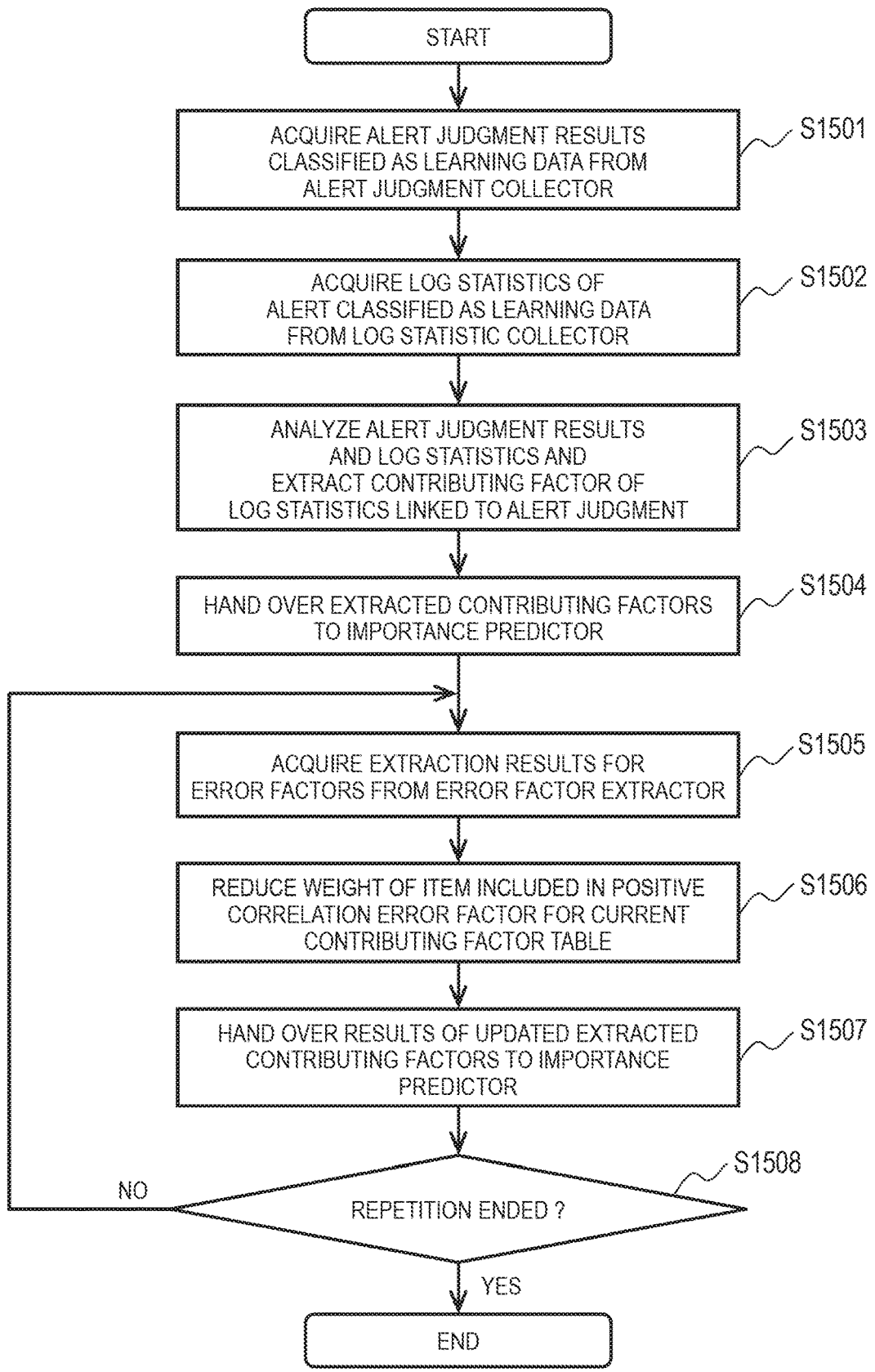
FIG. 15 is a flowchart showing an example of contributing factor extraction process steps performed by the contributing factor extractor.

FIG. 15 is a flowchart showing an example of contributing factor extraction process steps performed by the contributing factor extractor 303. The contributing factor extractor 303 acquires alert judgment results classified as the learning data from the alert judgment collector 301 (step S1501). Step S1501 corresponds to step S801 of FIG. 8. The contributing factor extractor 303 acquires the log statistics of the alert classified as the learning data from the log statistic collector 302 (step S1502). Step S1502 corresponds to step S802 of FIG. 8. The contributing factor extractor 303 analyzes the alert judgment results and the log statistics and extracts contributing factors of the log statistics linked to the alert judgment (step S1503). Step S1503 corresponds to step S803 of FIG. 8.

The contributing factor extractor 303 hands over the contributing factor extraction results to the importance predictor 304 (step S1504). Step S1504 corresponds to step S804 of FIG. 8. The contributing factor extractor 303 acquires the error factor results from the error factor extractor 305 (step S1505). Step S1505 corresponds to step S814 of FIG. 8. The contributing factor extractor 303 reduces the weight 904 of the item included in the positive correlation error factor in the current contributing factor table 900 (step S1506). Step S1506 corresponds to step S815 of FIG. 8.

The contributing factor extractor 303 hands over the updated contributing factor extraction results to the importance predictor 304 (step S1507). Step S1507 corresponds to step S801 of FIG. 8 (step S816). The contributing factor extractor 303 judges whether the repeat trials have ended (step S1508). Step S1508 corresponds to step S810 of FIG. 8. If the repeat trials have not ended (step S1508: no), then the process returns to step S1505. If the repeat trials have ended (step S1508: yes), the contributing factor extractor 303 ends the contributing factor extraction process.

<Importance Prediction Process>

Figure 16:
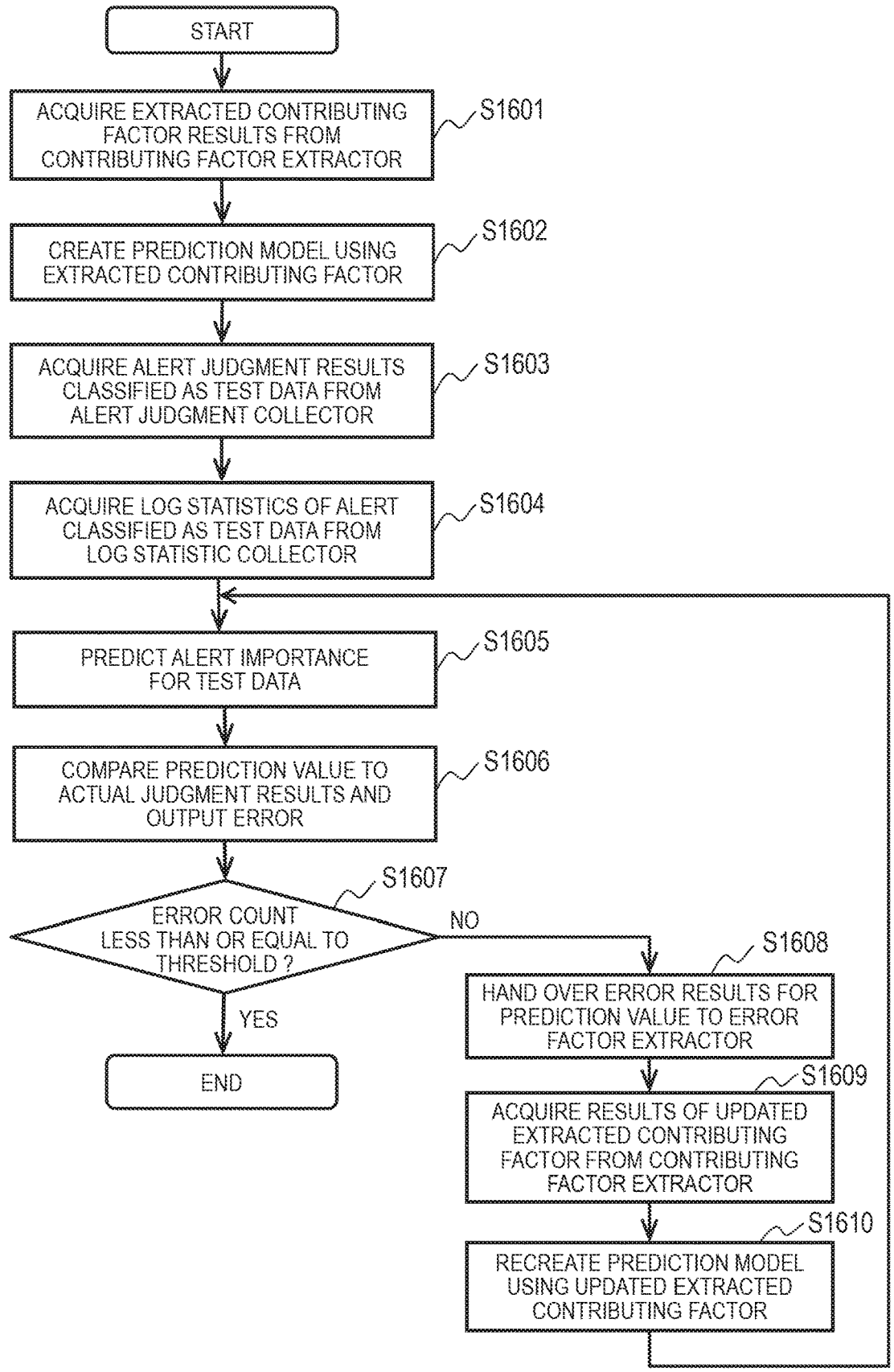
FIG. 16 is a flowchart showing an example of importance prediction process steps performed by the importance predictor.

FIG. 16 is a flowchart showing an example of importance prediction process steps performed by the importance predictor 304. The importance predictor 304 acquires the contributing factor extraction results from the contributing factor extractor 303 (step S1601). Step S1601 corresponds to step S804 of FIG. 8. The importance predictor 304 creates a prediction model using extracted contributing factors (step S1602). Step S1602 corresponds to step S805 of FIG. 8.

The importance predictor 304 acquires alert judgment results classified as the test data from the alert judgment collector 301 (step S1603). Step S1603 corresponds to step S806 of FIG. 8. The importance predictor 304 acquires the log statistics of the alert classified as the testing data from the log statistic collector 302 (step S1604). Step S1604 corresponds to step S807 of FIG. 8.

The importance predictor 304 predicts the alert importance for the test data according to the contributing factor extractor 303 (step S1605).

Step S1605 corresponds to step S808 of FIG. 8. The importance predictor 304 compares the prediction value to the actual judgment results and outputs the error (step S1606). Step S1606 corresponds to step S809 of FIG. 8.

The importance predictor 304 judges whether the error count is less than or equal to a threshold (step S1607). Step S1607 corresponds to step S810 of FIG. 8. If the error count is not less than or equal to the threshold (step S1607: no), then the importance predictor 304 hands over the error results of the prediction value to the error factor extractor 305 (step S1608).

Step S1601 corresponds to step S811 of FIG. 8.

The importance predictor 304 acquires the updated contributing factor extraction results from the contributing factor extractor 303 (step S1609). Step S1609 corresponds to step S816 of FIG. 8. The importance predictor 304 uses the updated extracted contributing factors from the contributing factor extractor 303 to recreate the prediction model (step S1610) and returns to step S1605. Step S1610 corresponds to step S817 of FIG. 8. Meanwhile, in step S1607, if the error count is not less than or equal to the threshold (step S1607: no), then the importance predictor 304 ends the repeated trials indicated by the dotted frame of FIG. 8.

In the above description, alerts for attacks on a monitored system were described, but the present invention can be applied to events other than alerts. If the present invention were to be applied to power demand prediction, for example, then the response variable Y can be set to the power demand per hour and the predictor variables Xn can be set to the fluctuation in power demand over the past few hours, meteorological data in various locations (weather, temperature, humidity, wind direction, wind speed, barometric pressure, sunshine, etc.), population flow statistics in various locations, calendar information (day of week, holidays, etc.), amount of solar power generation, and the like, thereby allowing the alert analysis server 134 to create a prediction model by performing learning on the basis of power demand per hour up to the previous day and data of the predictor variables Xn at each hour, and to determine the prediction error by application of test data so as to recreate and optimize the prediction model, allowing power demand per hour to be predicted for the following day.

If applied to sales predictions, for example, the response variable Y can be set to the total sales at the shop per week and the predictor variables Xn can be set to the floor area per product classification (fresh produce, prepared foods, general foods, daily necessities, clothing, etc.), customer linger time per product classification, number of advertisements displayed per product classification, customer data (number of customers at store, gender, age, profession, address, etc.), and the like, thereby creating a prediction model by performing learning on the basis of the past sales amount per week at each shop and the predictor variable data for each week, and recreating and optimizing the prediction model by determining the prediction error by application of the test data, allowing the total sales at the shop to be predicted for the following week.

(1) In this manner, the alert analysis server 134 of the present embodiment executes, on the basis of a first prediction value (importance prediction value y_k) attained by applying to a prediction model a first appearance frequency (predictor variables x1_k, x2_k . . . xn_k) of log statistics (test data) for a contributing factor of a first event (data type: test alert) among a group of events, and results for the first appearance frequency (importance conversion value 506), a prediction error calculation process (S809) for calculating the prediction error for the first prediction value, and executes, on the basis of a correlation (second degree of correlation 1203) between a second appearance frequency (appearance frequency p2) for a contributing factor of a second event (data type: prediction alert) among the group of events, and the prediction error calculated by the prediction error calculation process, an error factor extraction process (S813) by which the error factors (contributing factor item 901 and range 902 of entries 1211 to 1215) of the prediction error are extracted from the contributing factors of the first event. As a result, it is possible to identify the contributing factors resulting in prediction error. Thus, the user can take into consideration the identified error factors and take measures to prevent the occurrence of certain events.

(2) Also, the alert analysis server 134 from (1) above executes a creation process for creating the prediction model on the basis of a third appearance frequency (appearance frequency p1) for contributing factors for a third event (data type: learning alert) among the group of events, and results for the third appearance frequency (importance conversion value q). In this manner, by creating the prediction model in advance using the learning data, it is possible to learn the prediction model.

(3) Also, in the alert analysis server 134 of (1) above, the group of events are a collection of events occurring from a prescribed point in time onward. In this manner, by using events that have occurred since a prescribed point in time, or in other words, by not using past events prior to the event, it is possible to identify error factors without being swayed by past judgment factors even if the characteristics of events have already changed as a result of a change in the attacks on the monitored system 100.

(4) Also, in the alert analysis server 134 of (1) above, the storage device 202 stores the weights 904 indicating the degree of importance of the contributing factors of the first event, the alert analysis server 134 executes the setting process (step S816) for setting the weight 904 of the error factor (contributing factor item 901 and range 902 of entries 1211 and 1215) extracted by the error factor extraction process among the contributing factors of the first event so as to be lower than the weight 904 of other contributing factors, and executes the updating process (step S817) for updating the prediction model on the basis of the third appearance frequency (appearance frequency p1) for contributing factors of the third event among the group of events, results for the third appearance frequency (importance conversion value q), the weight 904 of the error factor set by the setting process, and the weight 904 of the other contributing factor. In this manner, by updating the prediction model so as to reduce the effect of the error factors, it is possible to improve the prediction accuracy of the prediction value.

(5) Also, during the prediction error calculation process, the alert analysis server 134 of (4) above calculates the prediction error of the first prediction value on the basis of the first prediction value attained by applying the first appearance frequency to the prediction model updated by the updating process, and results corresponding to the first appearance frequency. In this manner, by recalculating the prediction error using the updated prediction model, it is possible to reduce the prediction error and increase the efficiency in narrowing down the error factors.

(6) The alert analysis server 134 of (4) above executes the prediction value calculation process (step S819) of calculating the second prediction value of the second event by applying the second appearance frequency (appearance frequency p2) to the prediction model updated by the updating process, and an output process (step S821) of outputting the second prediction value calculated by the prediction value calculating process. In this manner, by calculating the prediction error of the event by applying the prediction data, it is possible to improve prediction accuracy of the prediction value.

(7) The alert analysis server 134 of (6) above executes the judgment process (step S810) for judging whether to trial the setting process (step S816) and the updating process (step S817) on the basis of the error count, which is the number of cases of the second event for which there is an error outside of the allowable range between the first prediction value and the first results, and trials the setting process (step S816) and the updating process (step S817) on the basis of the judgment results by the judgment process. In this manner, a judgment is made as to whether to trial the updating process for the prediction model according to the error count, which is the number of cases, among the second event in which the data type is testing, for which there is an error outside of the allowable range between the importance prediction value 1003 and the importance conversion value 506, and thus, the update frequency of the prediction model is adjusted.

(8) Also, the alert analysis server 134 of (7) above trials the setting process (step S816) and the updating process (step S817) if the error count is greater than or equal to a threshold. In this manner, if the error count is greater than or equal to the threshold, then the update process for the prediction model is trialed, and thus, the update process for the prediction model is repeated until the error count is less than the threshold, thereby increasing the accuracy of the prediction value calculated from the prediction model.

(9) Also, the alert analysis server 134 of (7) above trials the prediction value calculation process (step S819) and the output process (step S821) if the error count is not greater than or equal to a threshold. In this manner, if the error count is not greater than or equal to the threshold, then the prediction value is calculated, and thus, the prediction value is not calculated while the error count is greater than or equal to the threshold. Thus, it is possible to mitigate a decrease in accuracy of the prediction value calculated from the prediction model.

(10) Also, the alert analysis server 134 of (6) above outputs the contributing factor used to update the prediction model. In this manner, by outputting the contributing factor used to update the prediction model, it is possible to understand which factor contributed to updating the prediction model.

(11) Also, the alert analysis server 134 of (6) above executes a contributing factor extraction process (steps S803, S815) of determining the correlation (first degree of correlation 903) between the third appearance frequency (appearance frequency p1) for a contributing factor of the third event (data type: learning alert) and results corresponding to the third appearance frequency (importance conversion value q), and extracting factors (contributing factor item 901 and range 902 of entries 1301, 1302) that reduce the accuracy of the prediction model from among contributing factors of the third event on the basis of the correlation (first degree of correlation 903) and the error factors (contributing factor item 901 and range 902 of entries 1211 to 1215), and during the output process (step S821), the contributing factors (contributing factor item 901 and range 902 of entries 1301, 1302) extracted by the contributing factor extraction process are outputted. In this manner, by extracting the contributing factors reducing the accuracy of the prediction model (contributing factor item 901 and range 902 of entries 1301 and 1302), it is possible to understand which contributing factor had a negative effect on the accuracy of the prediction model.

As described above, according to the present embodiment, it is possible to mitigate a decrease in prediction accuracy of the alert importance even if the dimensions (types of contributing factor items) of the feature values used in predicting the alert importance, the range, or both become multifaceted. Also, it is possible to eliminate error factors that are factors that result in a prediction error even if the dimensions (types of contributing factor items) of the feature values used in predicting the alert importance, the range, or both become multifaceted, and it is possible to improve the prediction accuracy of the alert importance even if the monitored system becomes large scale and the methods used in cyberattacks change daily and the number of such attacks increase. As a result, it is possible to contribute to the operation of an SOC 130 that is sustainable into the future.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An analysis apparatus comprising:
a processor; and
a storage device that stores a prediction model that predicts results for contributing factors of a group of events,
wherein the processor executes:
a prediction error calculation process in which, on a basis of a first prediction value attained by providing the prediction model with a first appearance frequency for contributing factors of a first event among the group of events, and results corresponding to the first appearance frequency, a prediction error of the first prediction value is calculated;
an error factor extraction process in which, on a basis of a correlation between a second appearance frequency for a contributing factor of a second event among the group of events and the prediction error calculated by the prediction error calculation process, an error factor of the prediction error is extracted from among the contributing factors of the first event, wherein the storage device stores a weighting that indicates a degree of importance of the first event,
a setting process of setting a weight of the error factor extracted by the error factor extraction process among the contributing factors of the first event so as to be lower than a weight of another contributing factor; and
an updating process of updating the prediction model on a basis of a third appearance frequency corresponding to contributing factors of a third event among the group of events, results corresponding to the third appearance frequency, the weight of the error factor set by the setting process, and the weight of said another contributing factor.

2. The analysis apparatus according to claim 1, wherein, in the prediction error calculation process, the processor, on the basis of the first prediction value attained by providing the prediction model updated by the updating process with the first appearance frequency, and results corresponding to the first appearance frequency, calculates a prediction error of the first prediction value.

3. The analysis apparatus according to claim 1, wherein the processor further executes:
   a prediction value calculation process of calculating a second prediction value of the second event by providing the prediction model updated by the updating process with the second appearance frequency; and
   an output process of outputting the second prediction value calculated by the prediction value calculation process.

4. The analysis apparatus according to claim 3, wherein the processor further executes a judgment process for judging whether to trial the setting process and the updating process on a basis of an error count that is a number of cases of the second event for which there is an error outside of an allowable range between the first prediction value and the first results, and
   wherein the processor trials the setting process and the updating process on a basis of judgment results by the judgment process.

5. The analysis apparatus according to claim 4, wherein the processor trials the setting process and the updating process if the error count is greater than or equal to a threshold.

6. The analysis apparatus according to claim 4, wherein the processor trials the prediction value calculation process and the output process if the error count is not greater than or equal to a threshold.

7. The analysis apparatus according to claim 3, wherein, in the output process, the processor outputs a contributing factor used to update the output prediction model.

8. The analysis apparatus according to claim 3, wherein the processor further executes a contributing factor extraction process of determining a correlation between the third appearance frequency for contributing factors of the third event and results corresponding to the third appearance frequency, and extracts contributing factors that reduce an accuracy of the prediction model from among the contributing factors of the third event on a basis of the correlation and the error factor, and
   wherein, in the output process, the processor outputs a contributing factor extracted by the contributing factor extraction process.

9. An analysis method performed by an analysis apparatus having a processor, and a storage device that stores a prediction model that predicts results for contributing factors of a group of events,
   wherein the processor executes:
      a prediction error calculation process in which, on a basis of a first prediction value attained by providing the prediction model with a first appearance fre-
quency for contributing factors of a first event among the group of events, and results corresponding to the first appearance frequency, a prediction error of the first prediction value is calculated;
      an error factor extraction process in which, on a basis of a correlation between a second appearance frequency for a contributing factor of a second event among the group of events and the prediction error calculated by the prediction error calculation process, an error factor of the prediction error is extracted from among the contributing factors of the first event, wherein the storage device stores a weighting that indicates a degree of importance of the first event,
      a setting process of setting a weight of the error factor extracted by the error factor extraction process among the contributing factors of the first event so as to be lower than a weight of another contributing factor; and
      an updating process of updating the prediction model on a basis of a third appearance frequency corresponding to contributing factors of a third event among the group of events, results corresponding to the third appearance frequency, the weight of the error factor set by the setting process, and the weight of said another contributing factor.

10. A non-transitory computer-readable recording medium having recorded thereon an analysis program that causes a processor that can access a storage device that stores a prediction model that predicts results for contributing factors of a group of events to execute:
   a prediction error calculation process in which, on a basis of a first prediction value attained by providing the prediction model with a first appearance frequency for contributing factors of a first event among the group of events, and results corresponding to the first appearance frequency, a prediction error of the first prediction value is calculated;
   an error factor extraction process in which, on a basis of a correlation between a second appearance frequency for a contributing factor of a second event among the group of events and the prediction error calculated by the prediction error calculation process, an error factor of the prediction error is extracted from among the contributing factors of the first event, wherein the storage device stores a weighting that indicates a degree of importance of the first event,
   a setting process of setting a weight of the error factor extracted by the error factor extraction process among the contributing factors of the first event so as to be lower than a weight of another contributing factor; and
   an updating process of updating the prediction model on a basis of a third appearance frequency corresponding to contributing factors of a third event among the group of events, results corresponding to the third appearance frequency, the weight of the error factor set by the setting process, and the weight of said another contributing factor.

* * * * *